United States Patent
Izumi et al.

(10) Patent No.: US 10,950,029 B2
(45) Date of Patent: *Mar. 16, 2021

(54) IMAGE PROCESSING APPARATUS AND IMAGE PROCESSING METHOD

(71) Applicant: SONY CORPORATION, Tokyo (JP)

(72) Inventors: Nobuaki Izumi, Kanagawa (JP); Hiroshi Oryoji, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/319,417

(22) PCT Filed: Jul. 27, 2017

(86) PCT No.: PCT/JP2017/027264
§ 371 (c)(1),
(2) Date: Jan. 21, 2019

(87) PCT Pub. No.: WO2018/030169
PCT Pub. Date: Feb. 15, 2018

(65) Prior Publication Data
US 2019/0279415 A1 Sep. 12, 2019

(30) Foreign Application Priority Data
Aug. 10, 2016 (JP) .............................. JP2016-157198

(51) Int. Cl.
G06T 15/04 (2011.01)
G06T 17/20 (2006.01)
(Continued)

(52) U.S. Cl.
CPC .............. *G06T 15/04* (2013.01); *G06T 17/00* (2013.01); *G06T 17/20* (2013.01); *H04N 5/247* (2013.01); *H04N 13/00* (2013.01)

(58) Field of Classification Search
None
See application file for complete search history.

(56) References Cited

U.S. PATENT DOCUMENTS

| 5,856,829 A * | 1/1999 | Gray, III ................. G06T 15/04 345/419 |
| 2012/0307010 A1* | 12/2012 | Evertt ................. H04N 13/268 348/46 |

(Continued)

FOREIGN PATENT DOCUMENTS

| CN | 103379352 A | 10/2013 |
| JP | 2013-156955 A | 8/2013 |
| JP | 2013-225740 A | 10/2013 |

OTHER PUBLICATIONS

Lionel Baboud, Xavier Décoret, "Rendering Geometry with Relief Textures", Jun. 2006, Proceedings of Graphics Interface 2006, pp. 195-201.*

(Continued)

Primary Examiner — Robert Bader
(74) Attorney, Agent, or Firm — Chip Law Group

(57) ABSTRACT

The present disclosure relates to an image processing apparatus and an image processing method which make it possible to generate an image using texture images and depth images of two viewpoints that represent a three-dimensional structure of a greater number of regions. A drawing section generates a texture image of a predetermined viewpoint using a texture image obtained by perspectively projecting, to a perspective projection face perpendicular to a sight line direction heading from each of two viewpoints which are opposed to each other across a center of a polygon, toward the center of the polygon, a rear face of the polygon and a depth image corresponding to the (Continued)

texture image of each of the viewpoints. The present disclosure can be applied, for example, to a display apparatus and the like.

14 Claims, 30 Drawing Sheets

(51) Int. Cl.
    *G06T 17/00*     (2006.01)
    *H04N 13/00*     (2018.01)
    *H04N 5/247*     (2006.01)

(56) References Cited

U.S. PATENT DOCUMENTS

2013/0278596 A1   10/2013   Wu et al.
2014/0085415 A1*   3/2014   Bici ..................... H04N 19/597
                                                              348/43

OTHER PUBLICATIONS

Alex Butler, Shahram Izadi, Otmar Hilliges, David Molyneaux, Steve Hodges, David Kim, "Shake'n'Sense: Reducing Interference for Overlapping Structured Light Depth Cameras", May 10, 2012, ACM, Proceedings of the SIGCHI Conference on Human Factors in Computing Systems, May 2012, pp. 1933-1936.*
Aljoscha Smolic, "An Overview of 3D Video and Free Viewpoint Video", 2009, Springer, Computer Analysis of Images and Patterns. CAIP 2009. Lecture Notes in Computer Science, vol. 5702. pp. 1-8.*
James F. Blinn, "W Pleasure, W Fun", Jun. 1998, IEEE, IEEE Computer Graphics and Applications, vol. 18, No. 3, pp. 78-82.*
Chunhui Mei, Voicu Popescu, Elisha Sacks, "The Occlusion Camera", Sep. 2005, Computer Graphics Forum, vol. 24, Issue 3, pp. 335-342.*
C. Andújar, J. Boo, P. Brunet, M. Fairén, I. Navazo, P. Vázquez, À. Vinacua, "Omni-directional Relief Impostors", Sep. 2007, Computer Graphics Forum, vol. 26, Issue 3, pp. 553-560.*
Pere-Pau Vazquez, Miguel Feixas, Mateu Sbert, Wolfgang Heidrich, "Automatic View Selection Using Viewpoint Entropy and its Application to Image-Based Modelling", 2003, Computer Graphics Forum, vol. 22, No. 4, pp. 689-700.*
Ingo Schiller, Reinhard Koch, "Datastructures for Capturing Dynamic Scenes with a Time-of-Flight Camera", 2009, Springer, Dynamic 3D Imaging. Dyn3D 2009. Lecture Notes in Computer Science, vol. 5742, pp. 42-57.*
Alexandre Hardy, Johannes Venter, "3-View Impostors", Jun. 2010, ACM, Afrigraph '10: Proceedings of the 7th International Conference on Computer Graphics, Virtual Reality, Visualisation and Interaction in Africa, pp. 129-138.*
Wurong Yu, Bugao Xu, "Surface Reconstruction from Two-view Body Scanner Data", 2008, Sage Publications, Textile Research Journal, vol. 78, No. 5, pp. 457-466.*
Takanori, et al., "3-7 MPEG Multi-View Image Coding Standardization", NICT, pp. 79-90 (English Abstract only).
Senoh, et al., "MPEG Multi-View Image Coding Standardization", 79-90 pages.
International Search Report and Written Opinion of PCT Application No. PCT/JP2017/027264, dated Sep. 5, 2017, 06 pages of ISRWO.

* cited by examiner

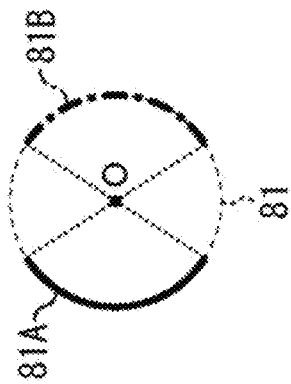
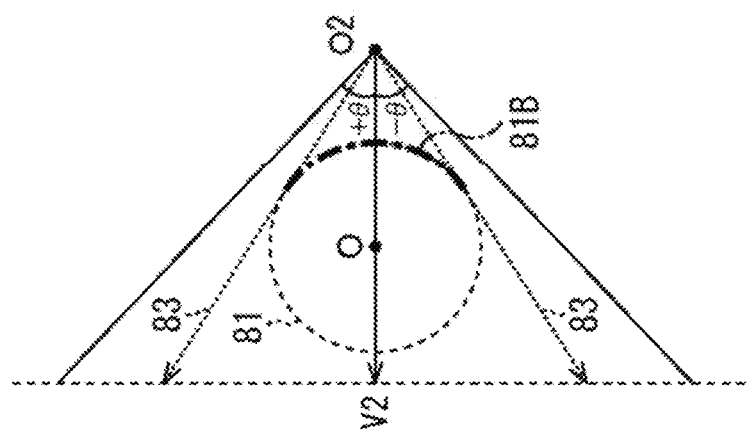
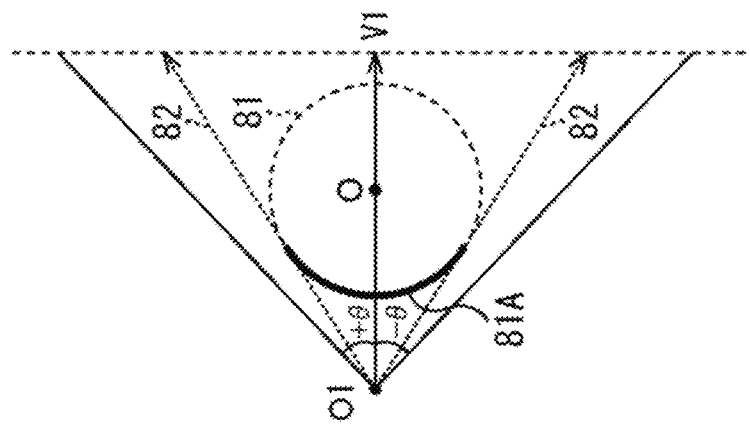
FIG. 3A
FIG. 3B
FIG. 3C

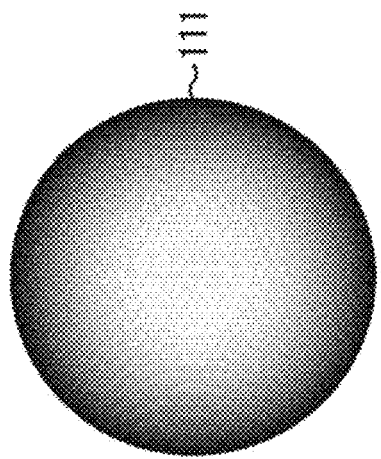
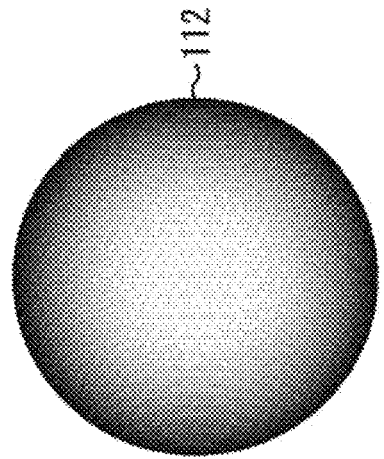
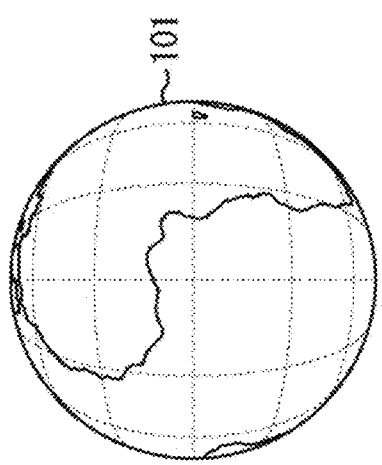
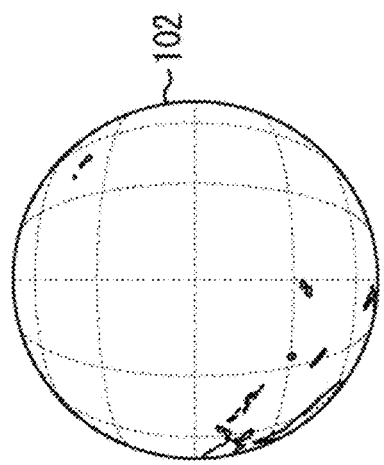
FIG. 4A
FIG. 4B

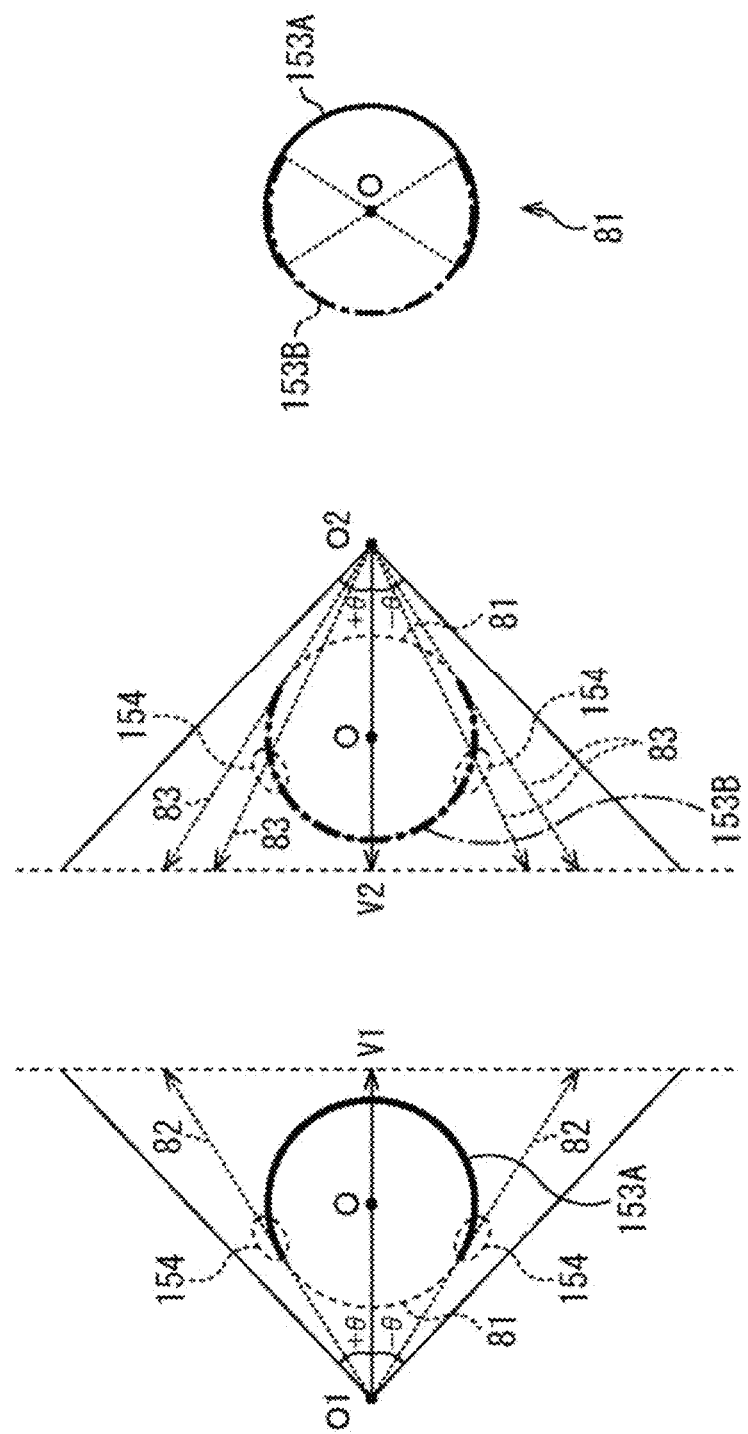

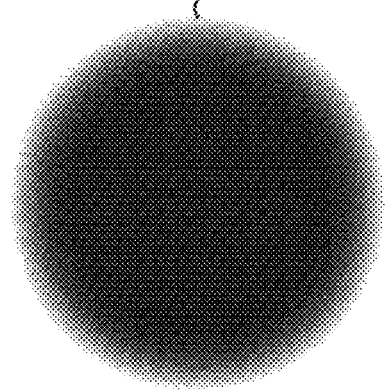
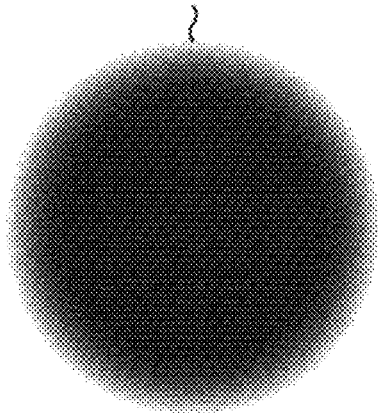
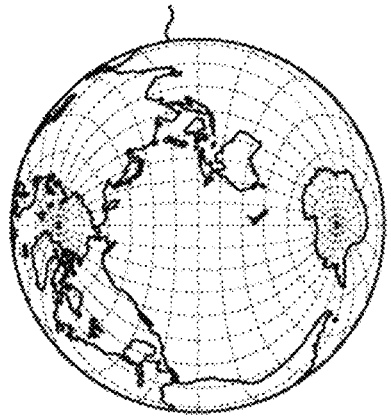
FIG. 9A
FIG. 9B

FIG. 21

| | AZIMUTH ANGLE | ELEVATION ANGLE | ROTATION ANGLE | SIGHT LINE INFORMATION (X, Y, Z) | | | TRANSVERSE FIELD ANGLE | VERTICAL FIELD ANGLE | TRANSVERSE PIXEL NUMBER | VERTICAL PIXEL NUMBER |
|---|---|---|---|---|---|---|---|---|---|---|
| VIEWPOINT 1 | 0° | 0° | 0° | 0 | 0 | −1.0 | 90° | 90° | 1024 | 1024 |
| VIEWPOINT 2 | −180° | 0° | 0° | 0 | 0 | 1.0 | 90° | 90° | 1024 | 1024 |

IMAGE PROCESSING APPARATUS AND IMAGE PROCESSING METHOD

CROSS REFERENCE TO RELATED APPLICATIONS

This application is a U.S. National Phase of International Patent Application No. PCT/JP2017/027264 filed on Jul. 27, 2017, which claims priority benefit of Japanese Patent Application No. JP 2016-157198 filed in the Japan Patent Office on Aug. 10, 2016. Each of the above-referenced applications is hereby incorporated herein by reference in its entirety.

TECHNICAL FIELD

The present disclosure relates to an image processing apparatus and an image processing method, and particularly to an image processing apparatus and an image processing method that make it possible to represent a three-dimensional structure of a greater number of regions using texture images and depth images of two viewpoints.

BACKGROUND ART

As a technique for representing a three-dimensional structure of an object, mainly a technique of representing a three-dimensional structure of an object using a polygon (3D mesh) of the object and a texture pasted to the polygon and a technique of representing a three-dimensional structure of an object using texture images and depth images obtained by perspectively projecting the object with respect to a plurality of viewpoints are available. The former technique is a technique used in a general CG (Computer Graphics) technology. The latter technique (hereinafter referred to as 2D depth technique) is high in affinity for a picked up image that is an image obtained by perspectively projecting an imaging object.

In a case where a three-dimensional structure of an object is represented by the 2D depth technique, data representing the three-dimensional structure is encoded using an encoding method such as MPEG MVD (Moving Picture Experts Group phase Multi-view+depth) (for example, refer to NPL 1).

CITATION LIST

Non Patent Literature

[NPL 1]
Takanori SENOH, Kenji YAMAMOTO, Ryutaro OI and Taiichiro KURITA "MPEG Multi-View Image Coding Standardization," Journal of the National Institute of Information and Communications Technology Vol. 56 Nos. 1/2, issued March, 2010

SUMMARY

Technical Problem

As described above, the 2D depth technique is a technique of representing a three-dimensional structure of an object using texture images (two-dimensional images) obtained by perspectively projecting the object with respect to a plurality of viewpoints and depth images corresponding to the texture images. Accordingly, the 2D depth technique cannot represent a three-dimensional structure of a region to which the object is not perspectively projected.

Therefore, by increasing the number of viewpoints for perspective projection to increase regions to be perspectively projected, a three-dimensional structure of a greater number of regions can be represented. However, as the number of viewpoints for perspective projection increases, a data amount necessary to represent a three-dimensional structure increases.

The present disclosure has been made in view of such a situation as described above and makes it possible to represent a three-dimensional structure of a greater number of regions using texture images and depth images of two viewpoints.

Solution to Problem

An image processing apparatus of a first aspect of the present disclosure is an image processing apparatus including an image generation section configured to generate a texture image of a predetermined viewpoint using a texture image obtained by projecting, to a projection face perpendicular to a sight line direction heading from each of two viewpoints which are opposed to each other across a center of a polygon, toward the center of the polygon, a rear face of the polygon and a depth image corresponding to the texture image of each of the viewpoints.

An image processing method of the first aspect of the present disclosure corresponds to the image processing apparatus of the first aspect of the present disclosure.

In the first aspect of the present disclosure, a texture image of a predetermined viewpoint is generated using a texture image obtained by projecting, to a projection face perpendicular to a sight line direction heading from each of two viewpoints which are opposed to each other across the center of a polygon, toward the center of the polygon, a rear face of the polygon and a depth image corresponding to the texture image of each of the viewpoints.

The image processing apparatus of a second aspect of the present disclosure is an image processing apparatus including an image generation section configured to generate a texture image by projecting, to a projection face perpendicular to a sight line direction heading from each of two viewpoints which are opposed to each other across a center of a polygon, toward the center of the polygon, a rear face of the polygon and generate a depth image corresponding to the texture image of each of the viewpoints.

An image processing method of the second aspect of the present disclosure corresponds to the image processing apparatus of the second aspect of the present disclosure.

In the second aspect of the present disclosure, to a projection face perpendicular to a sight line direction heading from each of two viewpoints which are opposed to each other across the center of a polygon, toward the center of the polygon, a rear face of the polygon is projected to generate a texture image, and a depth image that corresponds to the texture image of each of the viewpoints is generated.

It is to be noted that the image processing apparatus of the first aspect and the second aspect of the present disclosure can be implemented by causing a computer to execute a program.

Further, the program for being executed by a computer in order to implement the information processing apparatus of the first aspect and the second aspect of the present disclosure may be provided by transmission through a transmission medium or by recording the program in a recording medium.

Advantageous Effects of Invention

According to the first aspect of the present disclosure, an image can be generated. According to the first aspect of the present disclosure, an image can be generated using texture images and depth images of two viewpoints representing a three-dimensional structure of a greater number of regions.

Further, according to the second aspect of the present disclosure, an image can be generated. According to the second aspect of the present disclosure, a three-dimensional structure of a greater number of regions can be represented using texture images and depth images of two viewpoints.

It is to be noted that the advantageous effects described here are not necessarily restrictive and may be some advantageous effects described in the present disclosure.

BRIEF DESCRIPTION OF DRAWINGS

FIGS. 3A, 3B, and 3C are views illustrating a texture image generated by perspectively projecting a front face of each polygon and a depth image corresponding to the texture image.

FIGS. 4A and 4B are views illustrating a texture image generated by perspectively projecting a front face of each polygon and a depth image corresponding to the texture image.

FIGS. 8A, 8B, and 8C are views illustrating a texture image generated by perspectively projecting a rear face of each polygon and a depth image corresponding to the texture image.

FIGS. 9A and 9B are views illustrating a texture image generated by perspectively projecting a rear face of each polygon and a depth image corresponding to the texture image.

FIG. 21 is a view depicting an example of a table.

DESCRIPTION OF EMBODIMENTS

In the following, a mode for carrying out the present disclosure (hereinafter referred to as embodiment) is described. It is to be noted that the description is given in the following order.

Figure 29:
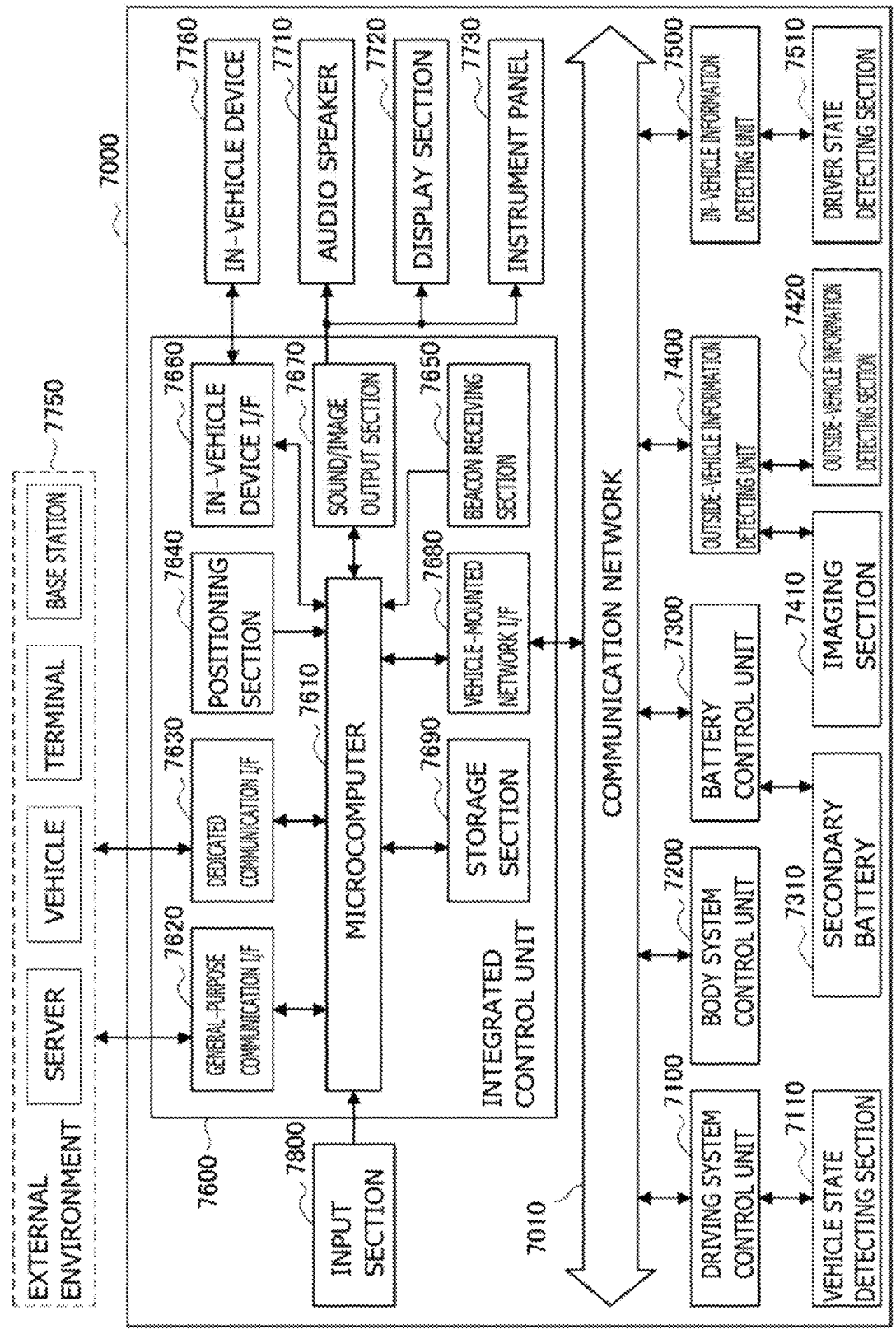
FIG. 29 is a block diagram depicting an example of schematic configuration of a vehicle control system.
Figure 30:
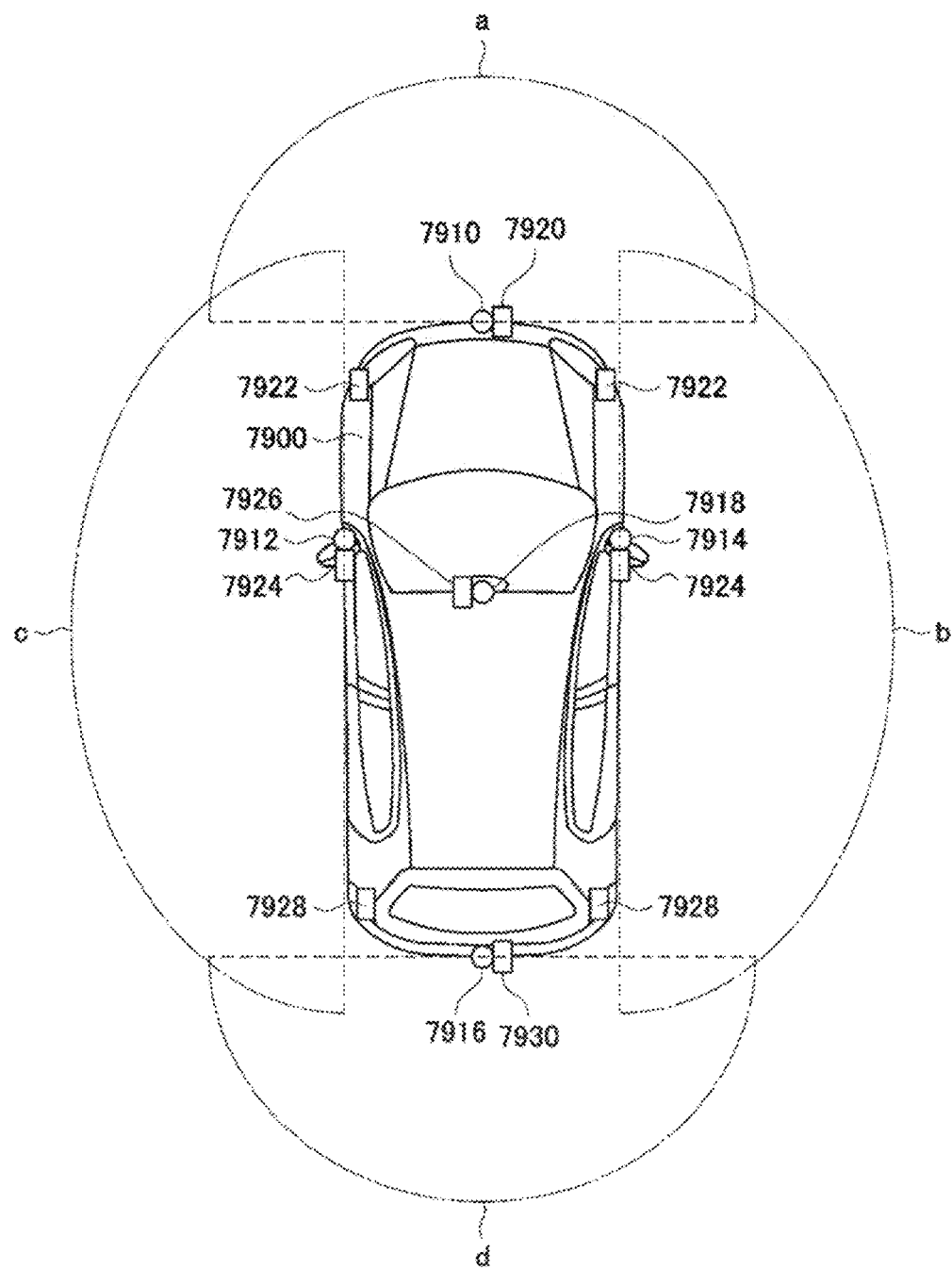
FIG. 30 is a diagram of assistance in explaining an example of installation positions of an outside-vehicle information detecting section and an imaging section.

1. First Embodiment: Generation Apparatus and Display Apparatus (FIGS. 1, 2, 3A, 3B, 3C, 4A, 4B, 5, 6, 7, 8A, 8B, 8C, 9A, 9B, 10A, 10B, 11, 12, 13, 14, and 15)
2. Second Embodiment: Generation Apparatus and Display Apparatus (FIGS. 16, 17, 18A, 18B, 19, 20, 21, 22, and 23)
3. Different Generation Method of Texture Image (FIG. 24)
4. Different Example of Texture Image (FIGS. 25A and 25B)
5. Third Embodiment: tan Axis Projection (FIGS. 26 and 27)
6. Fourth Embodiment: Computer (FIG. 28)
7. Application Example (FIGS. 29 and 30)

1. First Embodiment (Configuration Example of Generation Apparatus)

Figure 1:
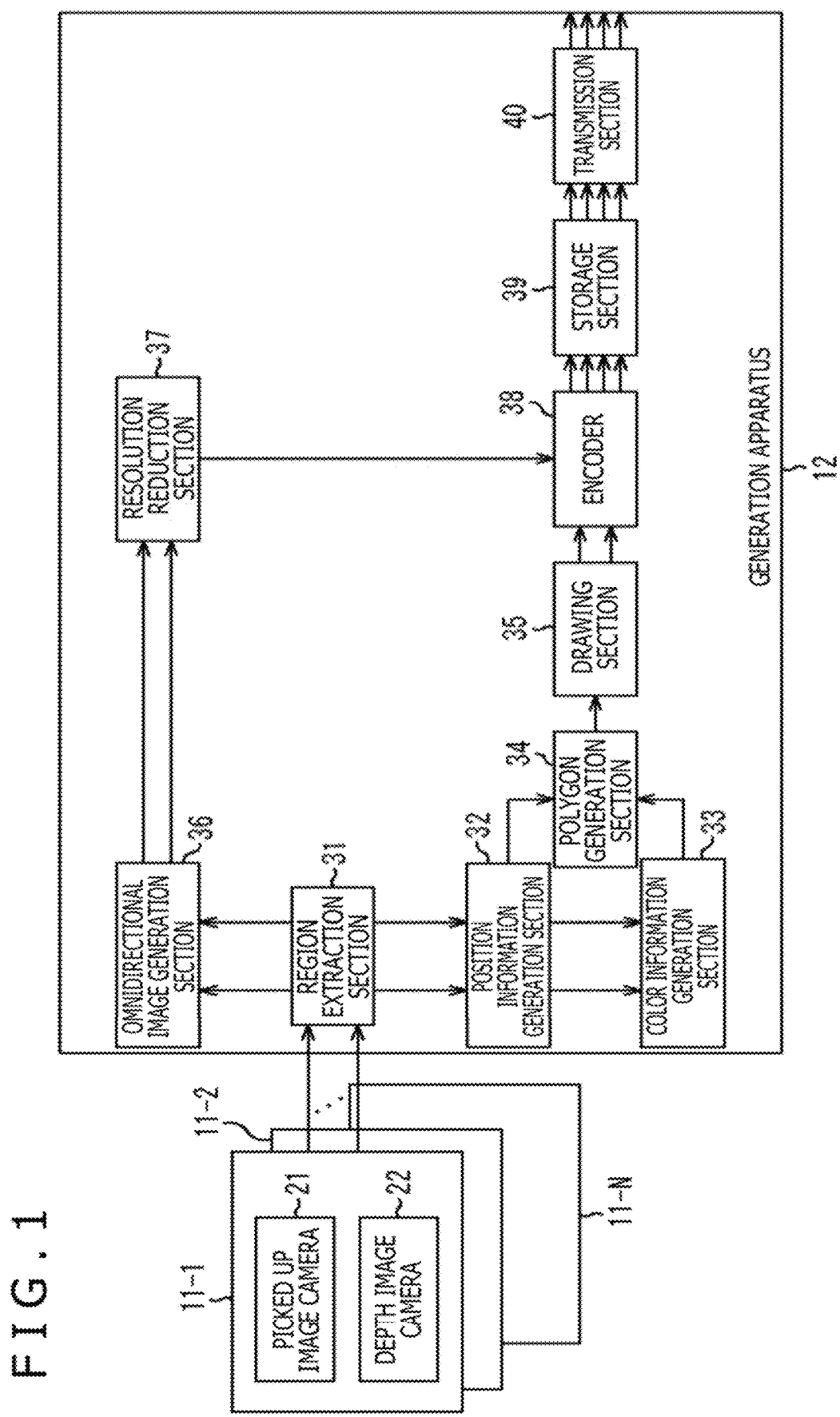
FIG. 1 is a block diagram depicting a configuration example of a first embodiment of a generation apparatus as an image processing apparatus to which the present disclosure is applied.

FIG. 1 is a block diagram depicting a configuration example of a first embodiment of a generation apparatus as an image processing apparatus to which the present disclosure is applied.

The generation apparatus 12 of FIG. 1 uses picked up images and depth images acquired by imaging apparatuses 11-1 to 11-N (N is equal to or greater than 2) to generate a texture image and a depth image of a main imaging object in the picked up images and a texture image and a depth image of an omnidirectional image.

In particular, the imaging apparatuses 11-1 to 11-N are arranged around a main imaging object and include at least part of the main imaging object in an imaging range thereof. Each of the imaging apparatuses 11-1 to 11-N includes an picked up image camera 21 and a depth image camera 22. The picked up image camera 21 images an imaging object to acquire a picked up image in a unit of a frame and supplies the picked up image to the generation apparatus 12. The depth image camera 22 acquires a position in a depth direction of the imaging object at each pixel of the picked up image, generates a depth image in which information representative of the position is used as a pixel value, and supplies the depth image to the generation apparatus 12. It is to be noted that, in the following description, in a case where there is no necessity to specifically distinguish the imaging apparatuses 11-1 to 11-N from each other, they are collectively referred to as an imaging apparatus 11.

The generation apparatus 12 includes a region extraction section 31, a position information generation section 32, a color information generation section 33, a polygon generation section 34, a drawing section 35, an omnidirectional image generation section 36, a resolution reduction section 37, an encoder 38, a storage section 39 and a transmission section 40.

The region extraction section 31 of the generation apparatus 12 extracts a region of a main imaging object from N picked up images and N depth images supplied from the N imaging apparatus 11 and supplies the regions to the position information generation section 32. Further, the region extraction section 31 extracts a region other than the region of the main imaging object as a background region from the N picked up images and the N depth images and supplies the background regions to the omnidirectional image generation section 36.

The position information generation section 32 uses the N depth images of the regions of the main imaging object supplied from the region extraction section 31 to generate position information of one or more polygons corresponding to the main imaging object. The position information of a polygon is three-dimensional coordinates of vertices of the polygon in a 3D model coordinate system that is a three-dimensional coordinate system having an origin at a center of the main imaging object. The position information generation section 32 supplies the position information of each polygon to the color information generation section 33 and the polygon generation section 34. Further, the position information generation section 32 supplies the N picked up images in the regions of the main imaging object to the color information generation section 33.

The color information generation section 33 uses position information of each polygon supplied from the position information generation section 32 and the N picked up images of the regions of the main imaging object to generate color information such as RGB values of a front face and a rear face of each polygon. In particular, the color information generation section 33 uses pixel values of the picked up images corresponding to the polygons to generate color information of the front face of each of the polygons. Further, the color information generation section 33 generates color information of the front face of each of the polygons also as color information of the rear face of each of the polygons. The color information generation section 33 supplies each piece of the color information of the front face and the rear face of each of the polygons to the polygon generation section 34.

It is to be noted that the color information of the front face of the polygon is represented by describing three-dimensional coordinates in a 3D model coordinate system of each vertex of the polygon in a clockwise direction around a normal vector to the front face and describing color information in an associated relationship with the three-dimensional coordinates. The color information of the rear face of the polygon is also represented similarly to the color information of the front face.

The polygon generation section 34 generates each of the polygons on the basis of the position information of each of the polygons supplied from the position information generation section 32 and pastes a texture to each of the front face and the rear face of each of the polygons on the basis of the color information of each of the front face and the rear face of each of the polygons supplied from the color information generation section 33. The polygon generation section 34 supplies each of the polygons having the texture pasted to the front face and the rear face of each of the polygons, to the drawing section 35.

The drawing section 35 (image generation section) performs perspective projection of the rear face of each of the polygons to a perspective projection face in regard to each of two viewpoints determined in advance that are opposed to each other across the origin of the 3D model coordinate system that is the center of one or more polygons of the main imaging object to generate texture images of the two viewpoints. In particular, the drawing section 35 perspectively projects, for each of the two viewpoints, the rear face of each polygon to a perspective projection face that is a normal whose center is passed by a straight line in a sight line direction heading from each viewpoint to the origin to generate texture images of the two viewpoints. In the present specification, an "opposed position" not only is an opposed position but also includes the proximity to the opposed position within a range within which a technical effect of the present disclosure is achieved. Similarly, the "normal" includes not only a normal itself but also a line having an angle to the face that is proximate to the vertical.

It is to be noted that, although a format of a texture image is not specifically restricted, the YCbCr420 format can be adopted, for example. The drawing section 35 generates depth images individually corresponding to texture images of two viewpoints on the basis of polygons. The drawing section 35 supplies the texture images of two viewpoints and the depth images to the encoder 38.

The omnidirectional image generation section 36 perspectively projects N picked up images of the background region supplied from the region extraction section 31 to a regular octahedron centered at the origin of the 3D model coordinate system to generate a texture image of an omnidirectional image over 360 degrees around in a horizontal direction and 180 degrees around in a vertical direction. It is to be noted that the omnidirectional image may not be an image of an all space of a sphere over 360 degrees around in a horizontal direction and 180 degrees around in a vertical direction but may be an image of a partial space if the technological effect of the present disclosure is achieved. The omnidirectional image generation section 36 perspectively projects N depth images of the background supplied from the region extraction section 31 to the regular octahedron similarly to the picked up images to generate a depth image of an omnidirectional image. The omnidirectional image generation section 36 supplies the texture image and the depth image of the omnidirectional image to the resolution reduction section 37.

The resolution reduction section 37 converts the texture image and the depth image of the omnidirectional image supplied from the omnidirectional image generation section 36 into those of low resolution and supplies them to the encoder 38.

The encoder 38 encodes the texture images of two viewpoints supplied from the drawing section 35 and the depth images and encodes the texture image and the depth image of the omnidirectional image supplied from the resolution reduction section 37. Although the AVC (Advanced Video Coding) method, HEVC method, MVD method, or the like can be used as the encoding method for encoding of them, it is assumed that the AVC method is used here.

Accordingly, the encoder 38 generates, by encoding, encoded streams of the texture images of the viewpoints (hereinafter referred to as viewpoint texture streams) and encoded streams of the depth images (hereinafter referred to as viewpoint depth streams). Further, the encoder 38 generates, by encoding, an encoded stream of the texture image of the omnidirectional image of the reduced resolution (hereinafter referred to as an omnidirectional texture stream) and an encoded stream of the depth image of the omnidirectional image of the reduced resolution (hereinafter referred to as an omnidirectional depth stream). The encoder 38 supplies the viewpoint texture streams of two viewpoints and the viewpoint depth streams as well as the omnidirectional texture stream and the omnidirectional depth stream to the storage section 39.

The storage section 39 stores the viewpoint texture streams of two viewpoints and the viewpoint depth streams as well as the omnidirectional texture stream and the omnidirectional depth stream supplied thereto from the encoder 38.

The transmission section 40 reads out and transmits the viewpoint texture streams of two viewpoints stored in the storage section 39 and viewpoint depth streams as well as the omnidirectional texture stream and the omnidirectional depth stream.

The generation apparatus 12 converts polygons and color information representative of a three-dimensional structure of a main imaging object into texture images and depth images of two viewpoints in such a manner as described above. Accordingly, the generation apparatus 12 can encode the texture images and the depth images of two viewpoints using a generally used image encoding method to reduce the data amount of them. As a result, a transmission bandwidth of data representing the three-dimensional structure of the main imaging object can be reduced.

It is to be noted that, although the generation apparatus 12 of FIG. 1 generates the polygons and color information, the generation apparatus 12 may generate some other information of a point cloud or the like as long as it is information that represents a three-dimensional structure used in the CG technology.

Further, while, in the example of FIG. 1, the depth image camera 22 acquires a depth image of a pixel number equal to that of a picked up image, in a case where the depth image camera 22 acquires a depth image of a pixel number smaller than that of a picked up image, a depth image interpolation section interpolating pixel values of a depth image is provided between the region extraction section 31 and the position information generation section 32. In this case, the depth image interpolation section interpolates pixel values of a depth image to make the pixel number of the depth image equal to the pixel number of the picked up image.

Furthermore, while, in the example of FIG. 1, each imaging apparatus 11 acquires a depth image, the depth image may be generated from picked up images acquired from an imaging apparatus 11 corresponding to the depth image and a different imaging apparatus 11.

(Arrangement Example of Image Pickup Apparatus)

Figure 2:
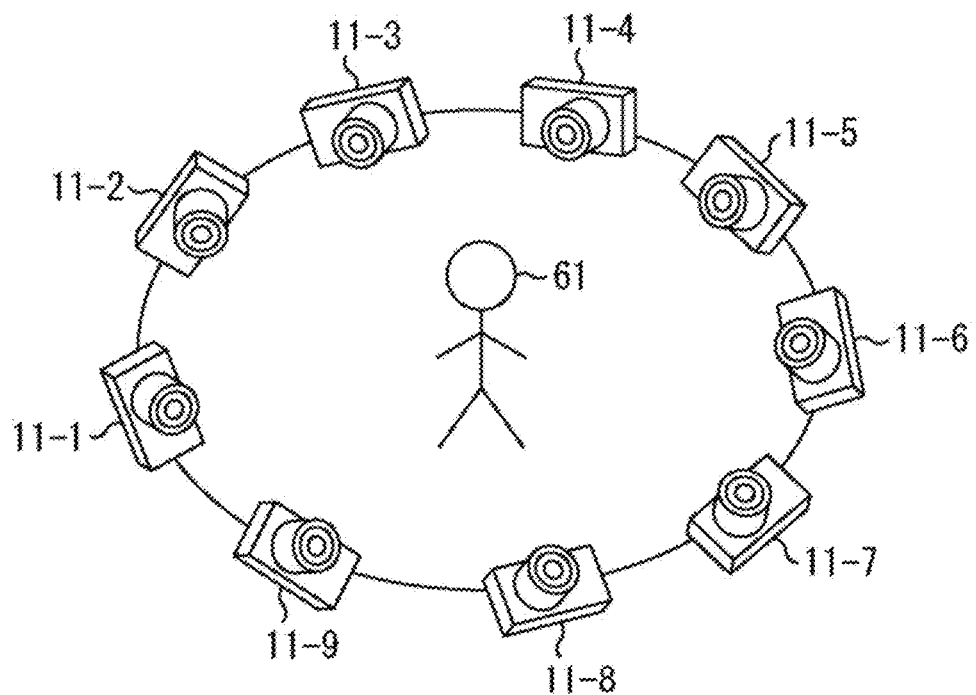
FIG. 2 is a view depicting an arrangement example of an imaging apparatus.

FIG. 2 is a view depicting an arrangement example of the imaging apparatus 11 of FIG. 1.

In the example of FIG. 2, N is 9.

As depicted in FIG. 2, the nine imaging apparatuses 11-1 to 11-9 are arranged so as to surround a main imaging object 61.

(Description of Effect)

FIGS. 3A, 3B, 3C, 4A, 4B, and 5 are views illustrating, for each of two viewpoints opposing to each other across the origin of a 3D model coordinate system, a texture image generated by perspectively projecting the front face of each polygon to a perspective projection face and a depth image corresponding to the texture image.

In the examples of FIGS. 3A, 3B, 3C, 4A, 4B, and 5, a polygon of a main imaging object forms a sphere 81. In this instance, as depicted in FIG. 5A, in a texture image generated by perspectively projecting a front face of the sphere 81 with respect to a perspective projection face in a sight line direction V1 from the viewpoint O1 that is one of the two viewpoints, a texture pasted to a region 81A on the front face of the sphere 81 that crosses first with each of projection directions 82 is drawn. The projection directions are directions that extend from the viewpoint and are within a range in which an absolute value of an angle defined with respect to the sight line direction is equal to one-half of a field angle (θ, in the example of FIGS. 3A, 3B, and 3C). Further, the depth image corresponding to the texture image is an image representative of the position in the depth direction (sight line direction V1) of the region 81A with respect to the viewpoint O1.

Further, as depicted in FIG. 3B, in a texture image generated by perspectively projecting the front face of the sphere 81 to a perspective projection face in a sight line direction V2 from the viewpoint O2 that is the other one of the two viewpoints, a texture pasted to a region 81B on the front face of the sphere 81 that crosses first with each of projection directions 83 is drawn. Further, the depth image corresponding to the texture image is an image representative of the position in the depth direction (sight line direction V2) of the region 81B with respect to the viewpoint O2.

Accordingly, as depicted in FIG. 3C, the texture image and the depth image from the viewpoint O1 and the texture image and the depth image from the viewpoint O2 can be used to represent a three-dimensional structure of the two regions 81A and 81B opposing to each other across a center of the sphere 81. However, on the surface of the sphere, a region other than the region 81A and the region 81B exists. In other words, a region of the surface of the sphere 81 with which a three-dimensional structure cannot be represented by the texture image and the depth image from the viewpoint O1 and the texture image and the depth image from the viewpoint O2 exists.

For example, in a case where a world map is applied as a texture to the front face and a rear face of the sphere 81 and the sky above the Atlantic Ocean off the coast of Africa is the viewpoint O1, part of the African Continent and the South American Continent pasted as a texture to the front face of the region 81A is drawn in a texture image 101 of the viewpoint O1 as depicted on the left side in FIG. 4A.

Further, in this case, the viewpoint O2 is in the sky above the Pacific Ocean, and part of the Australian Continent pasted as a texture to the front face of the region 81B is drawn in a texture image 102 of the viewpoint O2 as depicted on the left side in FIG. 4B. However, the Antarctica and the like are not drawn in any of the texture image 101 and the texture image 102.

Further, as depicted on the right side in FIG. 4A and on the right side in FIG. 4B, a depth image 111 corresponding to the texture image 101 and another depth image 112 corresponding to the texture image 102 are same. It is to be noted that, in a depth image, as the distance of the position in the depth direction of an imaging object at each pixel increases, the pixel value (luminance value) decreases. Accordingly, in the depth image 111 and the depth image 112, the pixel value is highest at the center and decreases as the distance from the center increases.

Figure 5:
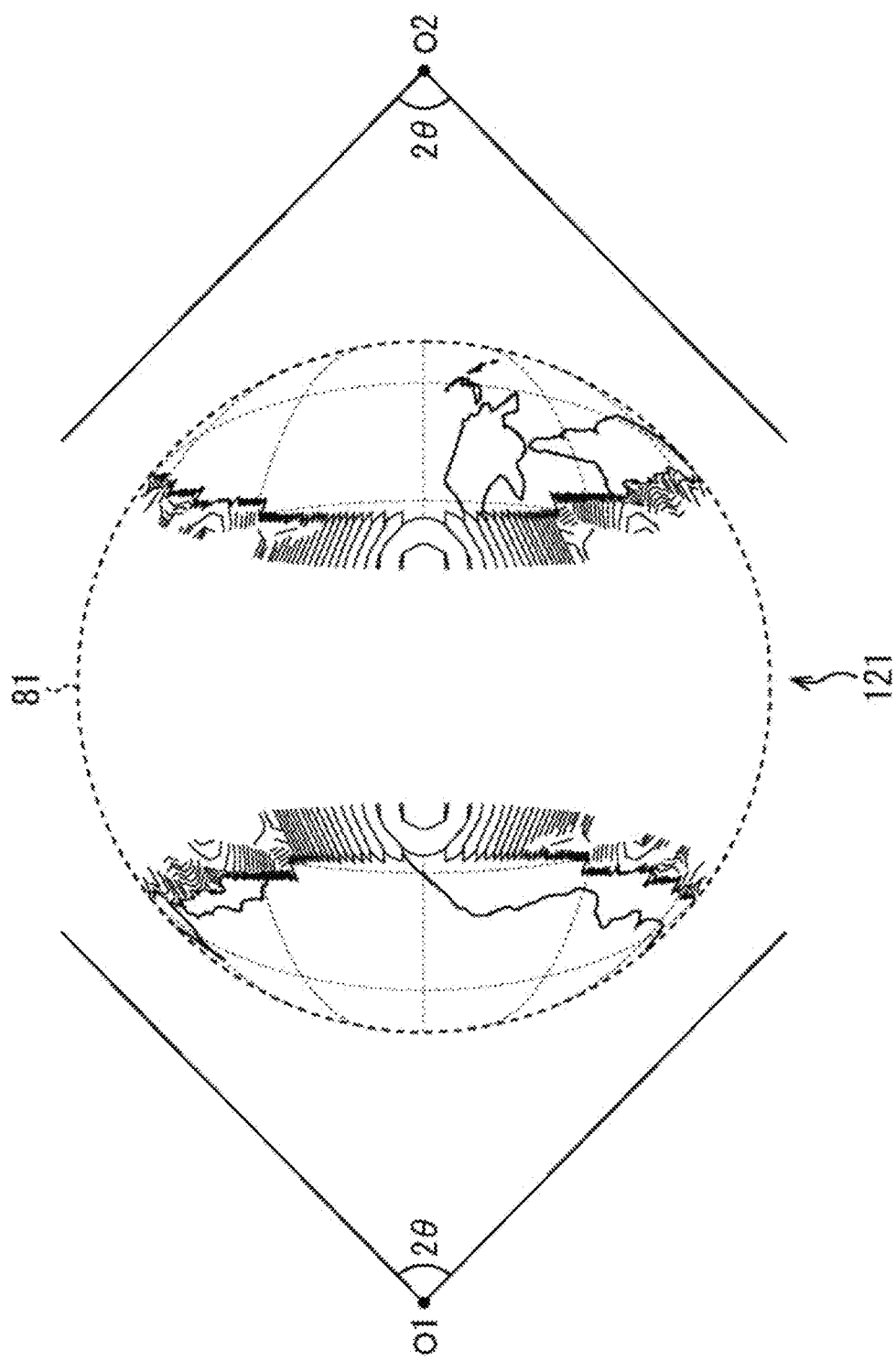
FIG. 5 is a view illustrating a texture image generated by perspectively projecting a front face of each polygon and a depth image corresponding to the texture image.

In this manner, in any of the texture image 101 and the texture image 102, the Antarctica and the like are not drawn. Accordingly, as depicted in FIG. 5, a three-dimensional structure 121 reconstructed using the texture image 101 and the depth image 111 as well as the texture image 102 and the depth image 112 is only part of the sphere 81 having the world map pasted to the front face and the rear face as a texture.

While, in the example of FIGS. 3A, 3B, 3C, 4A, 4B, and 5, the shape of the polygon is the comparatively simple sphere 81, in a case where the shape of the polygon is complicated, a region of the polygon whose three-dimensional structure cannot be represented by texture images of two viewpoints increases.

Figure 6:
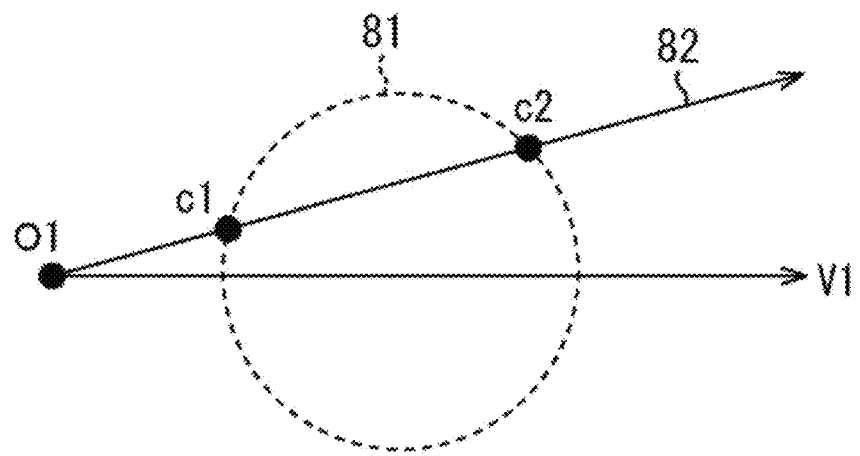
FIG. 6 is a view illustrating a texture image generated by perspectively projecting a rear face of a sphere and a depth image corresponding to the texture image.
Figure 7:
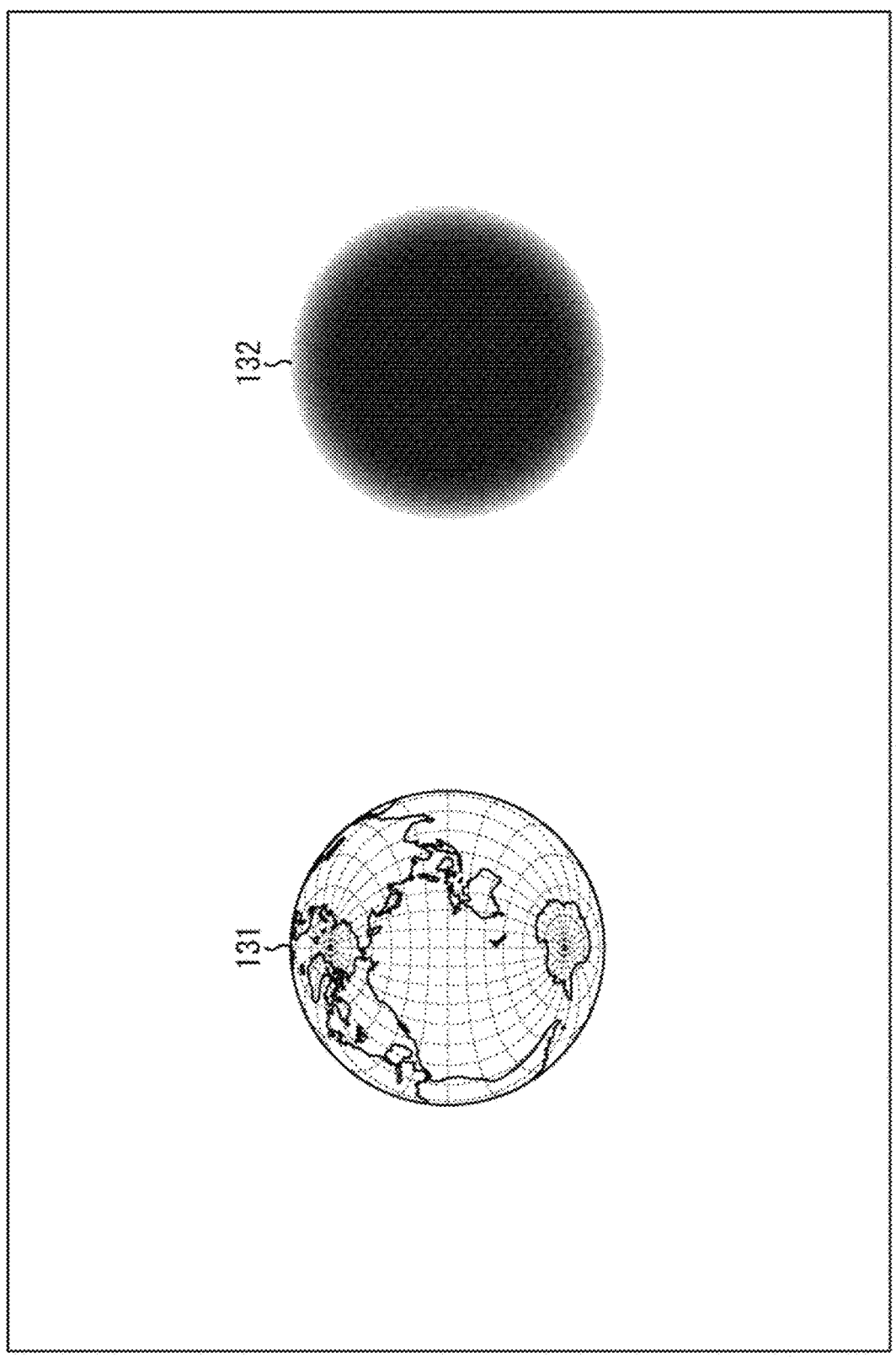
FIG. 7 is a view illustrating a texture image generated by perspectively projecting a rear face of a sphere and a depth image corresponding to the texture image.

FIGS. 6 and 7 are views illustrating a texture image generated by perspectively projecting the rear face of the sphere 81 with respect to the viewpoint O1 to a perspective projection face in the sight line direction V1 and a depth image corresponding to the texture image.

As described hereinabove, in a case where a texture image is generated by perspectively projecting the front face of the sphere 81 to the perspective projection face in the sight line direction V1 with respect to the viewpoint O1, a texture applied to each of points c1 on the front face of the sphere 81 with which each of the projection directions 82 first crosses is drawn in the texture image as depicted in FIGS. 8A, 8B, and 8C. Further, the depth image corresponding to this texture image is an image representative of the position in the depth direction (sight line direction V1) at each point c1 with respect to the viewpoint O1.

On the other hand, in a case where a texture image is generated by perspectively projecting the rear face of the sphere 81 to the perspective projection face in the sight line direction V1 with respect to the viewpoint O1, a texture applied to each of the points c2 on the rear face of the sphere 81 with which each of the projection directions 82 first crosses is drawn in the texture image as depicted in FIGS. 8A, 8B, and 8C. Further, the depth image corresponding to this texture image is an image representative of the position in the depth direction (sight line direction V1) at each point c2 with respect to the viewpoint O2.

For example, in a case where a world map is pasted as a texture to the front face and the rear face of the sphere 81 and the sky above the Atlantic Ocean off the coast of Africa is the viewpoint O1, as depicted in FIGS. 9A and 9B, to a texture image 131 of the viewpoint O1, the North American Continent, part of the South American Continent, the Antarctica, part of the European Continent, the Asian Continent and the Australian Continent pasted as a texture to the rear face of each of the points c2 are drawn. Further, in a depth image 132 corresponding to the texture image 131, the pixel value is lowest at the center and decreases as the distance from the center increases.

FIGS. 8A, 8B, 8C, 9A, 9B, 10A, 10B, and 10C are views illustrating, for each of two viewpoints opposing to each other across the origin of a 3D model coordinate system, a texture image generated by perspectively projecting the rear face of a polygon to a perspective projection face and a depth image corresponding to the texture image.

In the example of FIGS. 8A, 8B, 8C, 9A, 9B, 10A, 10B, and 10C, the polygon of the main imaging object is a sphere 81. In this case, as depicted in A of FIG. 8A, to a texture image generated by perspectively projecting the rear face of the sphere 81 to a perspective projection face in a sight line direction V1 with respect to the viewpoint O1, a texture pasted to a region 153A of the rear face on the sphere 81 with which each of the projection directions 82 crosses first is drawn. Further, a depth image corresponding to the texture image is an image representative of the position in the depth direction (sight line direction V1) of the region 81A with respect to the viewpoint O1.

Meanwhile, as depicted in FIG. 8B, to a texture image generated by perspectively projecting the rear face of the sphere 81 to a perspective projection face in a sight line direction V2 with respect to the other viewpoint O2 of the two viewpoints, a texture pasted to a region 153B of the rear face on the sphere 81 with which each of the projection directions 83 crosses first is drawn. Further, a depth image corresponding to the texture image is an image representative of the position in the depth direction (sight line direction V2) of the region 81B with respect to the viewpoint O2.

Accordingly, as depicted in FIG. 8C, a three-dimensional structure of the two regions 153A and 153B opposed to each other across the center of the sphere 81 can be represented with the texture image and the depth image of the viewpoint O1 and the texture image and the depth image of the viewpoint O2.

It is to be noted that, as depicted in FIG. 8C, the region 153A and the region 153B overlap with each other. Accordingly, a three-dimensional structure of the entire sphere 81 can be represented with the texture image and the depth image of the viewpoint O1 and the texture image and the depth image of the viewpoint O2.

For example, in a case where a world map is applied as a texture to the front face and the face of the sphere 81 and the sky above the Atlantic Ocean off the coast of Africa is the viewpoint O1, the North American Continent, part of the South American Continent, the Antarctica, part of the European Continent, the Asian Continent and the Australian Continent pasted as a texture to the rear face of the region 153A are drawn in a texture image 161 of the viewpoint O1 as depicted on the left side in FIG. 9A.

Further, in this case, the viewpoint O2 is in the sky above the Pacific Ocean, and the African Continent, the North American Continent, the South American Continent, the Antarctica and part of the European Continent pasted as a texture to the rear face of the region 153B are drawn in a texture image 162 of the viewpoint O2 as depicted on the left side in FIG. 9B. Accordingly, all of the seven continents are drawn in at least one of the texture image 161 and the texture image 162.

Further, as depicted on the right side in FIG. 9A and FIG. 9B, a depth image 163 corresponding to the texture image 161 and a depth image 164 corresponding to the texture image 162 are same. In the depth image 163 and the depth image 164, the pixel value is highest at the center and decreases as the distance from the center increases.

Figure 10B:
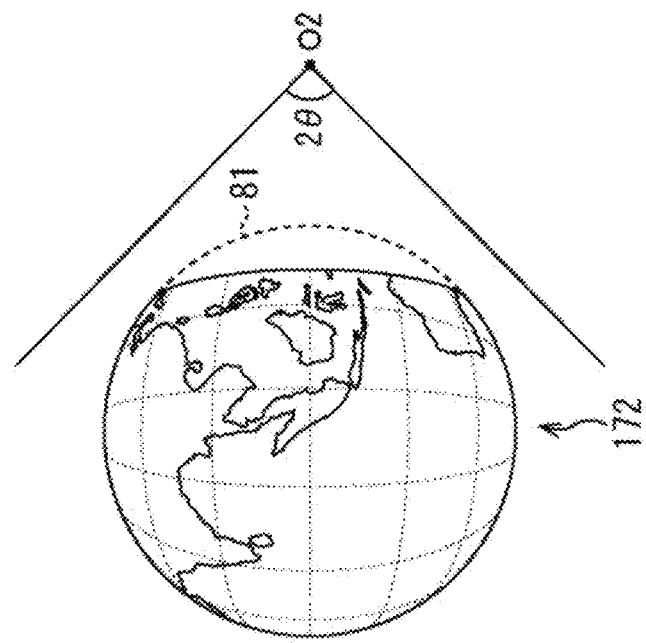
FIGS. 10A and 10B are views illustrating a texture image generated by perspectively projecting a rear face of each polygon and a depth image corresponding to the texture image.
Figure 10A:
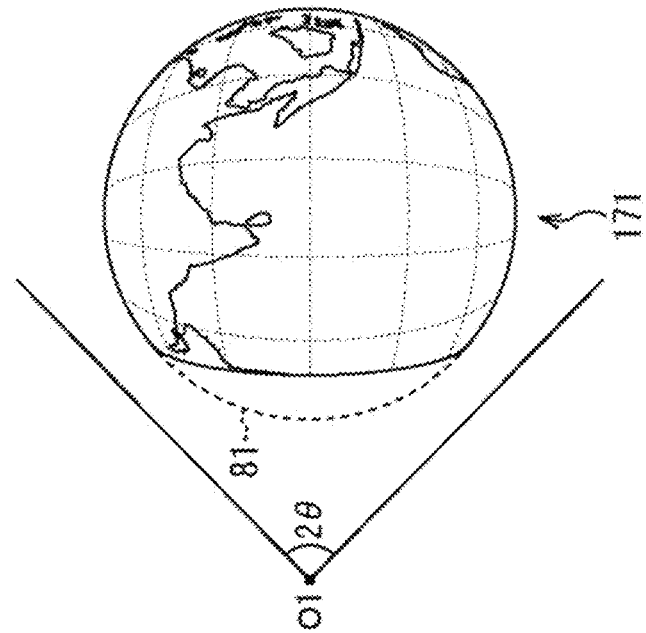

All of the seven continents are drawn in at least one of the texture image 161 and the texture image 162 in such a manner as described above. Accordingly, as depicted in FIG. 10A, a three-dimensional structure 171 reconstructed using the texture image 161 and the depth image 163 is a portion greater than one-half of the sphere 81 on the viewpoint O2 side (right half in the figure). Meanwhile, as depicted in FIG. 10B, a three-dimensional structure 172 reconstructed using the texture image 162 and the depth image 164 is a portion greater than one half the sphere 81 on the viewpoint O1 side (left half in the figure). Therefore, by reconstructing the three-dimensional structures using the texture image 161 and the depth image 163 as well as the texture image 162 and the depth image 164, the entire sphere 81 can be generated.

It is to be noted that the overlapping portion of the region 153A and the region 153B is generated using the texture image 161 and the depth image 163 or the texture image 162 and the depth image 164.

For example, as depicted in FIG. 8A, in a case where each region 154 of end portions of the region 153A within the overlapping region of the region 153A and the region 153B is perspectively projected with respect to the viewpoint O1, the angle with respect to a projection direction 82 is small. Accordingly, with the texture image 161 and the depth image 163, a three-dimensional structure of the region 154 can be represented with high accuracy.

However, in a case where the region 154 is perspectively projected with respect to the viewpoint O2 as depicted in FIG. 8B, the angle of the region 154 with respect to a projection direction 83 is greater in comparison with that in a case where it is perspectively projected with respect to the viewpoint O1. Accordingly, with the texture image 162 and the depth image 164, a three-dimensional structure of the region 154 can be represented with higher accuracy in comparison with the texture image 161 and the depth image 163. Therefore, the region 154 is generated using the texture image 162 and the depth image 164.

By generating the overlapping region of the region 153A and the region 153B using one of the texture image 161 and the depth image 163 and the texture image 162 and the depth image 164, which corresponds to a projection direction having a greater angle with respect to the overlapping region, the accuracy in reconstruction of the sphere 81 can be improved.

(Description of Processing of Generation Apparatus)

Figure 11:
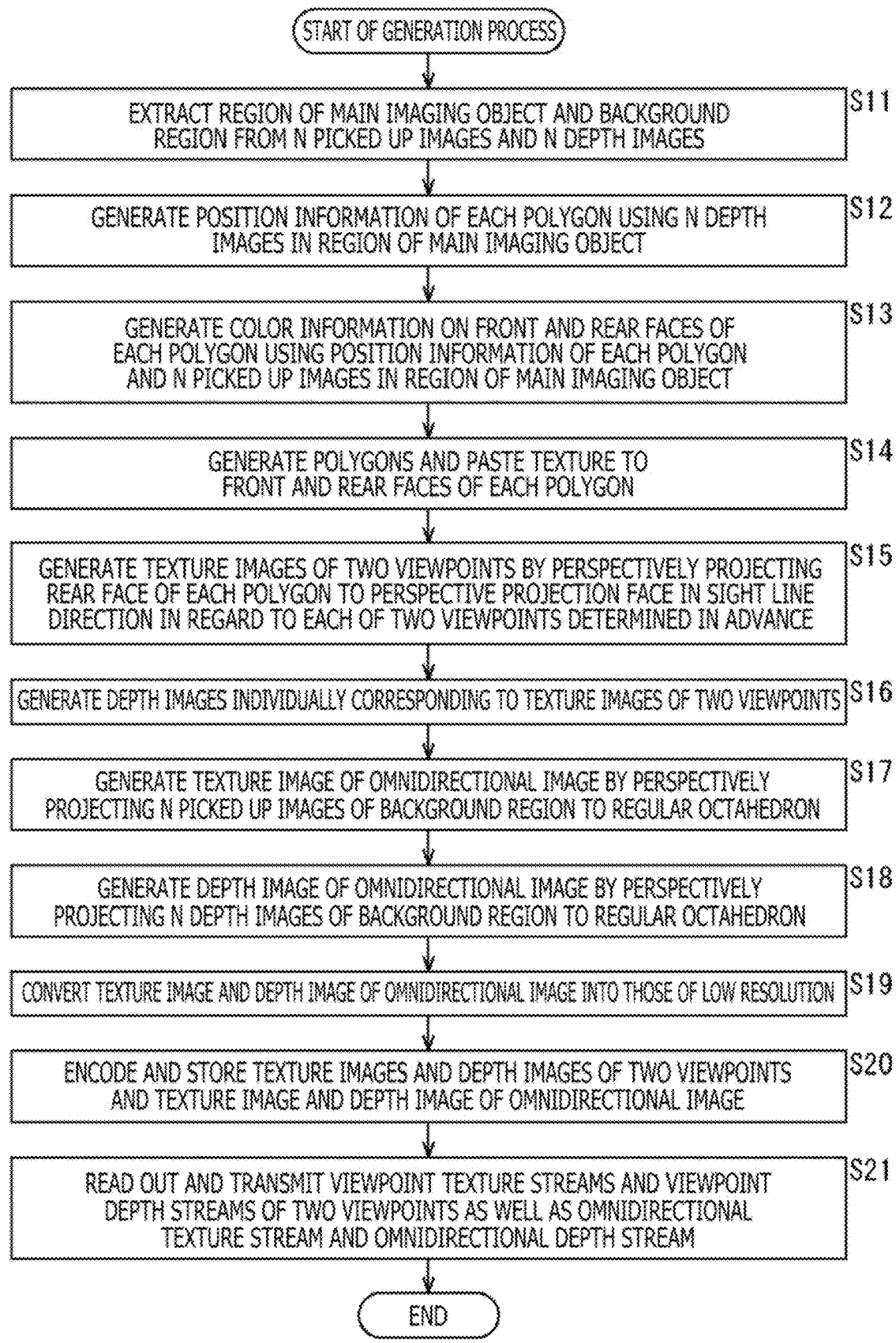
FIG. 11 is a flow chart illustrating a generation process in the generation apparatus of FIG. 1.

FIG. 11 is a flow chart illustrating a generation process by the generation apparatus 12 of FIG. 1. This generation process is performed for each of frames of N picked up images and N depth images acquired by the N imaging apparatus 11.

At step S11 of FIG. 11, the region extraction section 31 of the generation apparatus 12 extracts a region of a main imaging object and a background region from N picked up images and N depth images supplied from the imaging apparatus 11. The region extraction section 31 supplies the N picked up images and depth images in the region of the main imaging object to the position information generation section 32 and supplies the N picked up images and depth images in the background region to the omnidirectional image generation section 36.

At step S12, the position information generation section 32 uses the N depth images in the region of the main imaging object supplied from the region extraction section 31 to generate position information of each of polygons of the main imaging object and supplies the position information to the color information generation section 33 and the drawing section 35. Further, the position information generation section 32 supplies the N picked up images in the region of the main imaging object to the color information generation section 33.

At step S13, the color information generation section 33 uses the position information of each of the polygons and the N picked up images in the region of the main imaging object supplied from the position information generation section 32 to generate color information of the front face and the rear face of each of the polygons. The color information generation section 33 supplies the color information of the front face and the rear face of each of the polygons to the drawing section 35.

At step S14, the drawing section 35 generates polygons on the basis of the position information of each of the polygons supplied from the position information generation section 32 and pastes a texture to the front face and the rear face of each of the polygons on the basis of the color information of the front face and the rear face of each of the polygons supplied from the color information generation section 33.

At step S15, the drawing section 35 generates texture images of two viewpoints determined in advance by perspectively projecting, for each of the two viewpoints, the rear face of each of the polygons to a perspective projection face in the sight line direction. The drawing section 35 supplies the texture images of two viewpoints to the encoder 38.

At step S16, the drawing section 35 generates depth images individually corresponding to the texture images of two viewpoints on the basis of the polygons and supplies the depth images to the encoder 38.

At step S17, the omnidirectional image generation section 36 generates a texture image of an omnidirectional image by perspectively projecting the N picked up images in the background region supplied from the region extraction section 31 to a regular octahedron centered at the origin of the 3D model coordinate system and supplies the texture image of the omnidirectional image to the resolution reduction section 37.

At step S18, the omnidirectional image generation section 36 perspectively projects the N depth images in the background region supplied from the region extraction section 31 to the regular octahedron similarly to the picked up images to generate a depth image of an omnidirectional image and supplies the depth image of the omnidirectional image to the resolution reduction section 37.

At step S19, the resolution reduction section 37 converts the texture image and the depth image of the omnidirectional image supplied from the omnidirectional image generation section 36 into those of a lower resolution and supplies the texture image and the depth image of the omnidirectional image of the reduced resolution to the encoder 38.

At step S20, the encoder 38 encodes the texture images and the depth images of two viewpoints supplied from the drawing section 35 and the texture image and the depth image of an omnidirectional image supplied from the resolution reduction section 37. The encoder 38 supplies viewpoint texture streams and viewpoint depth streams of two viewpoints as well as an omnidirectional texture stream and an omnidirectional depth stream generated as a result of the encoding to the storage section 39 so as to be stored.

At step S21, the transmission section 40 reads out the viewpoint texture streams of two viewpoints and the viewpoint depth streams as well as the omnidirectional texture stream and the omnidirectional depth stream stored in the storage section 39 and transmits them. Then, the processing ends.

The generation apparatus 12 generates texture images and depth images of two viewpoints by perspectively projecting, for each of the two viewpoints opposed to each other across the origin of the 3D model coordinate system, the rear face of a polygon to the perspective projection face in the sight line direction of each viewpoint in such a manner as described above. Accordingly, the generated texture images and depth images of two viewpoints can represent a three-dimensional structure of a polygon of a main imaging object in a greater number of regions in comparison with an alternative case in which they are generated by perspectively projecting the front face of the polygon.

(Configuration Example of Display Apparatus)

Figure 12:
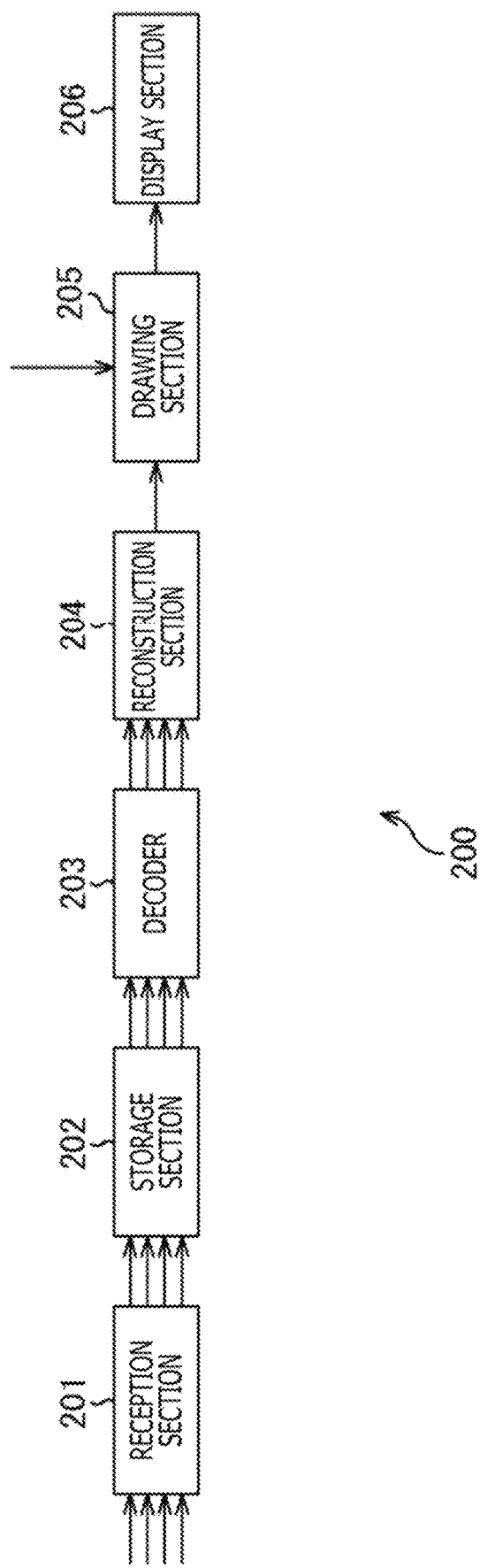
FIG. 12 is a block diagram depicting a configuration example of a first embodiment of a display apparatus as an image processing apparatus to which the present disclosure is applied.

FIG. 12 is a block diagram depicting a configuration example of the first embodiment of a display apparatus as an image processing apparatus to which the present disclosure is applied.

The display apparatus 200 of FIG. 12 receives viewpoint texture streams of two viewpoints and viewpoint depth streams as well as an omnidirectional texture stream and an omnidirectional depth stream transmitted from the generation apparatus 12 of FIG. 1 to generate a texture image of a predetermined viewpoint.

In particular, the display apparatus 200 includes a reception section 201, a storage section 202, a decoder 203, a reconstruction section 204, a drawing section 205, and a display section 206.

The reception section 201 of the display apparatus 200 receives viewpoint texture streams and viewpoint depth streams of two viewpoints as well as the omnidirectional texture stream and the omnidirectional depth stream transmitted from the generation apparatus 12 and supplies them to the storage section 202.

The storage section 202 stores the viewpoint texture streams and the viewpoint depth streams of two viewpoints as well as the omnidirectional texture stream and the omnidirectional depth stream supplied from the reception section 201.

The decoder 203 reads out the viewpoint texture streams and viewpoint depth streams of two viewpoints as well as the omnidirectional texture stream and the omnidirectional depth stream from the storage section 202 and decodes them. The decoder 203 supplies the texture images and the depth images of two viewpoints as well as the omnidirectional texture image and omnidirectional depth image obtained as a result of the decoding to the reconstruction section 204.

The reconstruction section 204 reconstructs a three-dimensional structure of a main imaging object in the 3D model coordinate system using the pixels of the texture images and the depth images of two viewpoints supplied to the decoder 203. As described hereinabove, the texture images and the depth images of two viewpoints generated by the generation apparatus 12 can represent a three-dimensional structure of a polygon of a main imaging object in a greater number of regions in comparison with an alternative case in which they are generated by perspectively projecting the front face of the polygon. Accordingly, the number of regions of a main imaging object in which a three-dimensional structure is reconstructed using the decoded texture images and the depth images of two viewpoints is greater than that in an alternative case in which the texture images and the depth images of two viewpoints are generated by perspectively projecting a front face of a polygon.

Further, the reconstruction section 204 reconstructs a three-dimensional structure of the background region in the 3D model coordinate system using the texture image and the depth image of the omnidirectional image supplied from the decoder 203. The reconstruction section 204 supplies the position information and the color information of the three-dimensional structures of the main imaging objects and the background region to the drawing section 205.

The drawing section 205 (image generation section) generates, on the basis of the position information and the color information of the three-dimensional structures of the main imaging object and the background region supplied from the reconstruction section 204, a texture image of the viewpoint, the sight line direction, and the field angle in the 3D model coordinate system designated by a viewer or the like as a display image. The drawing section 205 supplies the generated display image to the display section 206.

The display section 206 displays the display image supplied from the drawing section 205. Consequently, the viewer can view the main imaging object from an arbitrary position, for example, around the main imaging object.

(Description of First Reconstruction Method)

Figure 13:
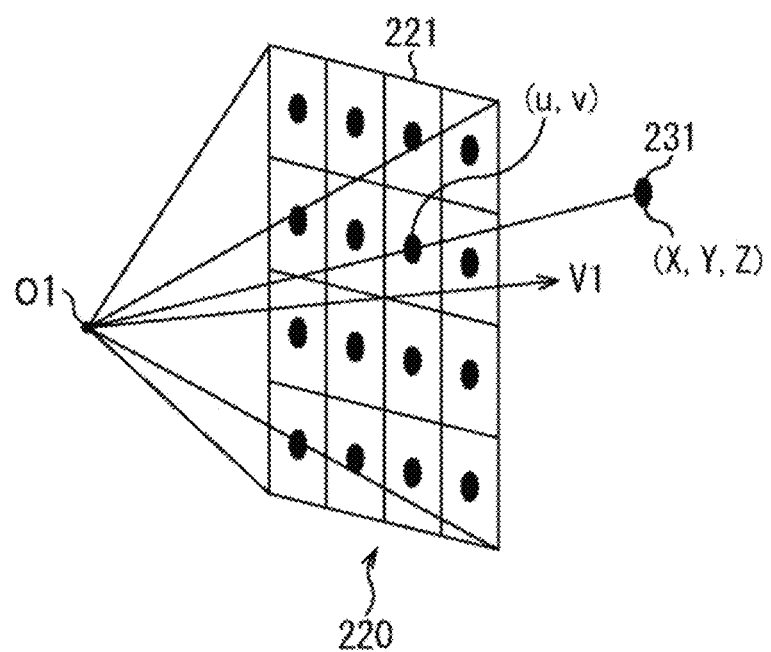
FIG. 13 is a view illustrating a first reconstruction method.

FIG. 13 is a view illustrating a first reconstruction method.

Note that it is assumed that, in the example of FIG. 13, the resolution of texture images and depth images of two viewpoints is 4 (horizontal)×4 (vertical) pixels for the convenience of description. Further, FIG. 13 illustrates a case in which a three-dimensional structure of a main imaging object is reconstructed using a texture image and a depth image of one viewpoint O1 of the two viewpoints.

The first reconstruction method is a method of reconstructing a three-dimensional structure using a point cloud. In particular, as depicted in FIG. 13, according to the first reconstruction method, the reconstruction section 204 generates, on the basis of a viewpoint O1, a sight line direction V1, a field angle 2θ, a position (u, v) of a sampling point 231, which corresponds to each pixel 221 of a texture image 220 of the viewpoint O1, on the texture image 220, and a pixel value of each pixel 221 of a depth image corresponding to the texture image 220, three-dimensional coordinates (X, Y, Z) of the sampling point 231 in a 3D model coordinate system.

Further, the reconstruction section 204 converts YCbCr values that are a pixel value of each pixel 221 of the texture image 220 into RGB values and determines them as RGB values of the sampling point 231 corresponding to the pixel 221. The reconstruction section 204 draws points of the RGB values of the sampling points 231 to the three-dimensional coordinate values (X, Y, Z) of the sampling points 231 to reconstruct a three-dimensional structure of the main imaging object. The reconstruction section 204 supplies the three-dimensional coordinates (X, Y, Z) of the sampling points 231 as position information of the three-dimensional structures of the main imaging objects to the drawing section 205 and supplies the RGB values of the sampling points 231 as color information of the three-dimensional structures of the main imaging objects to the drawing section 205.

(Description of Second Reconstruction Method)

Figure 14:
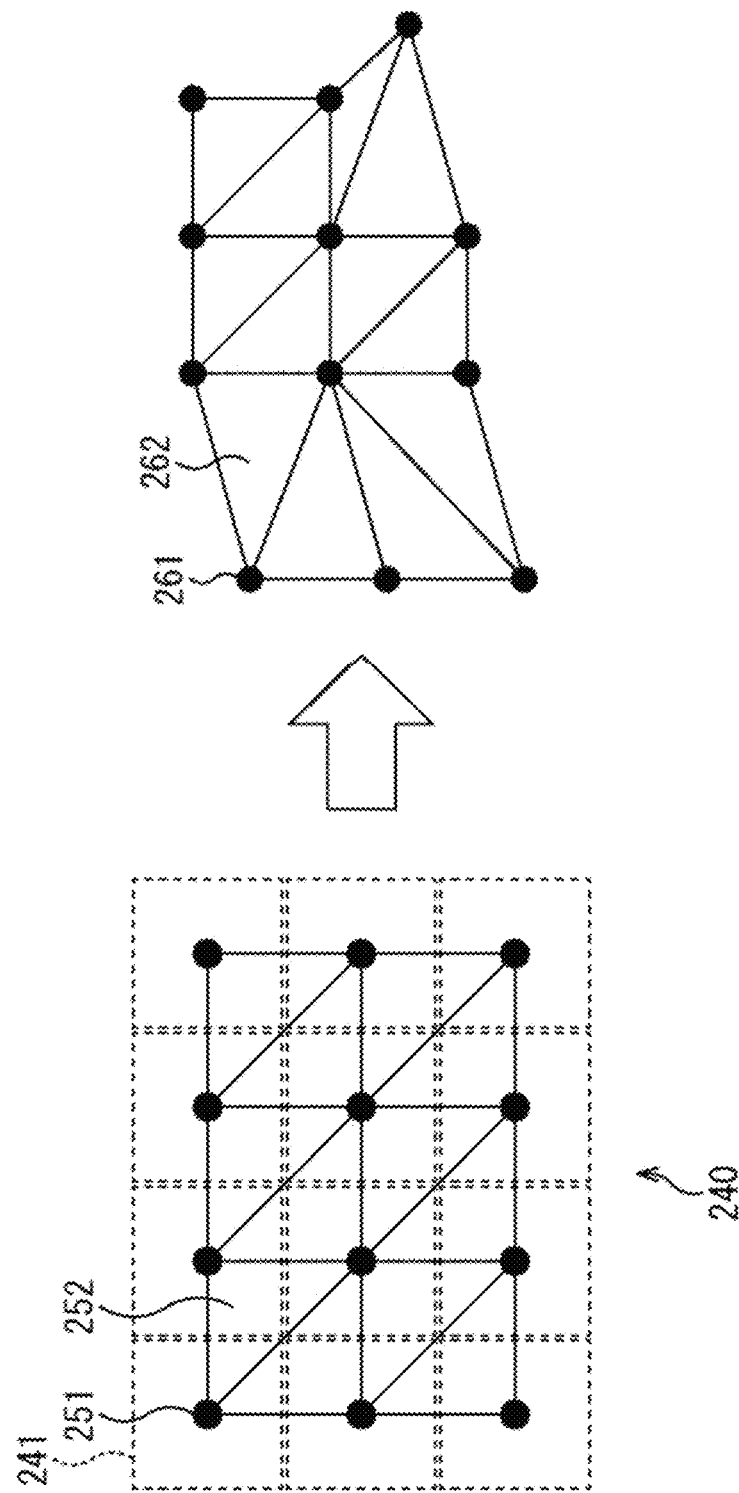
FIG. 14 is a view illustrating a second reconstruction method.

FIG. 14 is a view illustrating a second reconstruction method.

Note that it is assumed that, in the example of FIG. 14, the resolution of texture images and depth images of two viewpoints is 4 (horizontal)×3 (vertical) pixels for the convenience of description. Further, FIG. 14 depicts a case in which a three-dimensional structure of a main imaging object is reconstructed using a texture image and a depth image of one viewpoint O1 of two viewpoints.

The second reconstruction method is a method of reconstructing a three-dimensional structure using a triangle patch. In particular, as depicted on the left side in FIG. 14, in the second reconstruction method, the reconstruction section 204 generates sampling points 251 corresponding to pixels 241 on a texture image 240 of the viewpoint O1. The reconstruction section 204 connects three neighboring sampling points 251 from among the sampling points 251 corresponding to all pixels of the texture image 240 to generate triangle patches 252 having vertices at the three neighboring sampling points 251.

Then, the reconstruction section 204 generates, on the basis of the viewpoint O1, a sight line direction V1, a field angle 2θ, a position (u, v) of each sampling point 251 on the texture image 240, and a pixel value of each pixel 241 of a depth image corresponding to the texture image 240, three-dimensional coordinates (X, Y, Z) of the sampling point 251 in a 3D model coordinate system.

Then, the reconstruction section 204 arranges, as depicted on the right side in FIG. 14, sampling points 261 corresponding to the sampling points 251 in the 3D model coordinate system on the basis of the three-dimensional coordinates (X, Y, Z) of the sampling points 251. Further, the reconstruction section 204 connects sampling points 261 corresponding to three sampling points 251 configuring the vertices of the triangle patches 252 to generate triangle patches 262.

Further, the reconstruction section 204 converts, for each triangle patch 262, YCbCr values of the pixels 241 configuring the triangle patch 252 corresponding to the triangle patch 262 into RGB values and uses the RGB values to generate RGB values of the triangle patch 262. The reconstruction section 204 pastes, for each triangle patch 262, a texture of RGB values of the triangle patch 262 to the triangle patch 262. The reconstruction section 204 thereby reconstructs a three-dimensional structure of a main imaging object. The reconstruction section 204 supplies the three-dimensional coordinates (X, Y, Z) of the sampling points 261 that are vertices of the triangle patches 262 as positional information of the three-dimensional structures of a main imaging object to the drawing section 205. Further, the reconstruction section 204 supplies the RGB values of the triangle patches 262 as color information of the three-dimensional structures of the main imaging object to the drawing section 205.

While methods for reconstructing a three-dimensional structure of a main imaging object from a texture image and a depth image of the viewpoint O1 are described with reference to FIGS. 13 and 14, also a method for reconstructing a three-dimensional structure of a main imaging object from a texture image and a depth image of the viewpoint O2 and a method for reconstructing a three-dimensional structure of a background region from a texture image and a depth image of an omnidirectional image are similar to those just described.

Figure 15:
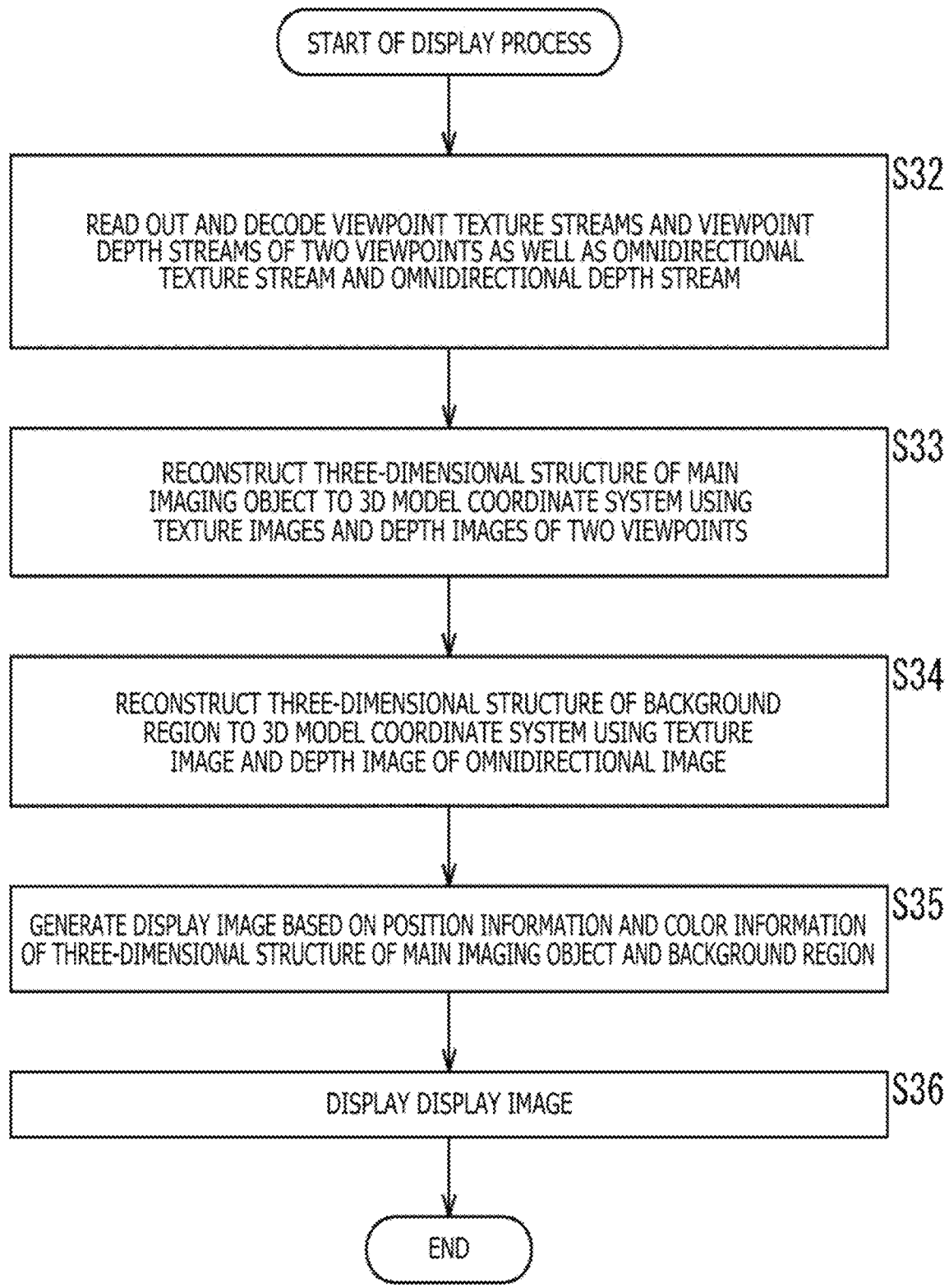
FIG. 15 is a flow chart illustrating a displaying process in the display apparatus of FIG. 12.

(Description of Processing of Display Apparatus) FIG. 15 is a flow chart illustrating a display process of the display apparatus 200 of FIG. 12. This display process is started, for example, when a request to display a display image is issued by a viewer in a state in which the viewpoint texture streams and the viewpoint depth streams of two viewpoints as well as the omnidirectional texture stream and the omnidirectional depth stream are stored in the storage section 202.

At step S32 of FIG. 15, the decoder 203 reads out and decodes the viewpoint texture streams and the viewpoint depth streams of two viewpoints as well as the omnidirectional texture stream and the omnidirectional depth stream from the storage section 202. The decoder 203 supplies texture images and depth images of two viewpoints and an omnidirectional texture image and an omnidirectional depth image obtained as a result of the decoding to the reconstruction section 204.

At step S33, the reconstruction section 204 reconstructs a three-dimensional structure of a main imaging object in a 3D model coordinate system using the texture images and the depth images of two viewpoints supplied from the decoder 203. The reconstruction section 204 supplies position information and color information of the three-dimensional structure of a main imaging object to the drawing section 205.

At step S34, the reconstruction section 204 reconstructs a three-dimensional structure of the background region in the 3D model coordinate system using the texture image and the depth image of an omnidirectional image supplied from the decoder 203. The reconstruction section 204 supplies the position information and the color information of the three-dimensional structure of the background region to the drawing section 205.

At step S35, the drawing section 205 generates, on the basis of the position information and the color information of the three-dimensional structures of the main imaging object and the background region supplied from the reconstruction section 204, a texture image having the viewpoint, a sight line direction, and a field angle in the 3D model coordinate system designated by the viewer or the like as a display image. The drawing section 205 supplies the generated display image to the display section 206.

At step S36, the display section 206 displays the display image supplied from the drawing section 205 and ends the processing.

The display apparatus 200 generates a display image using texture images and depth images of two viewpoints generated by the generation apparatus 12 in such a manner as described above. Accordingly, in comparison with an alternative case in which texture images and depth images of two viewpoints generated by perspectively projecting the front face of a polygon for each of the two viewpoints, it is possible to reconstruct a three-dimensional structure of a main viewing object in a greater number of regions and generate a display image from the three-dimensional structure. As a result, the picture quality of the display image is enhanced.

Second Embodiment (Configuration Example of Generation Apparatus)

Figure 16:
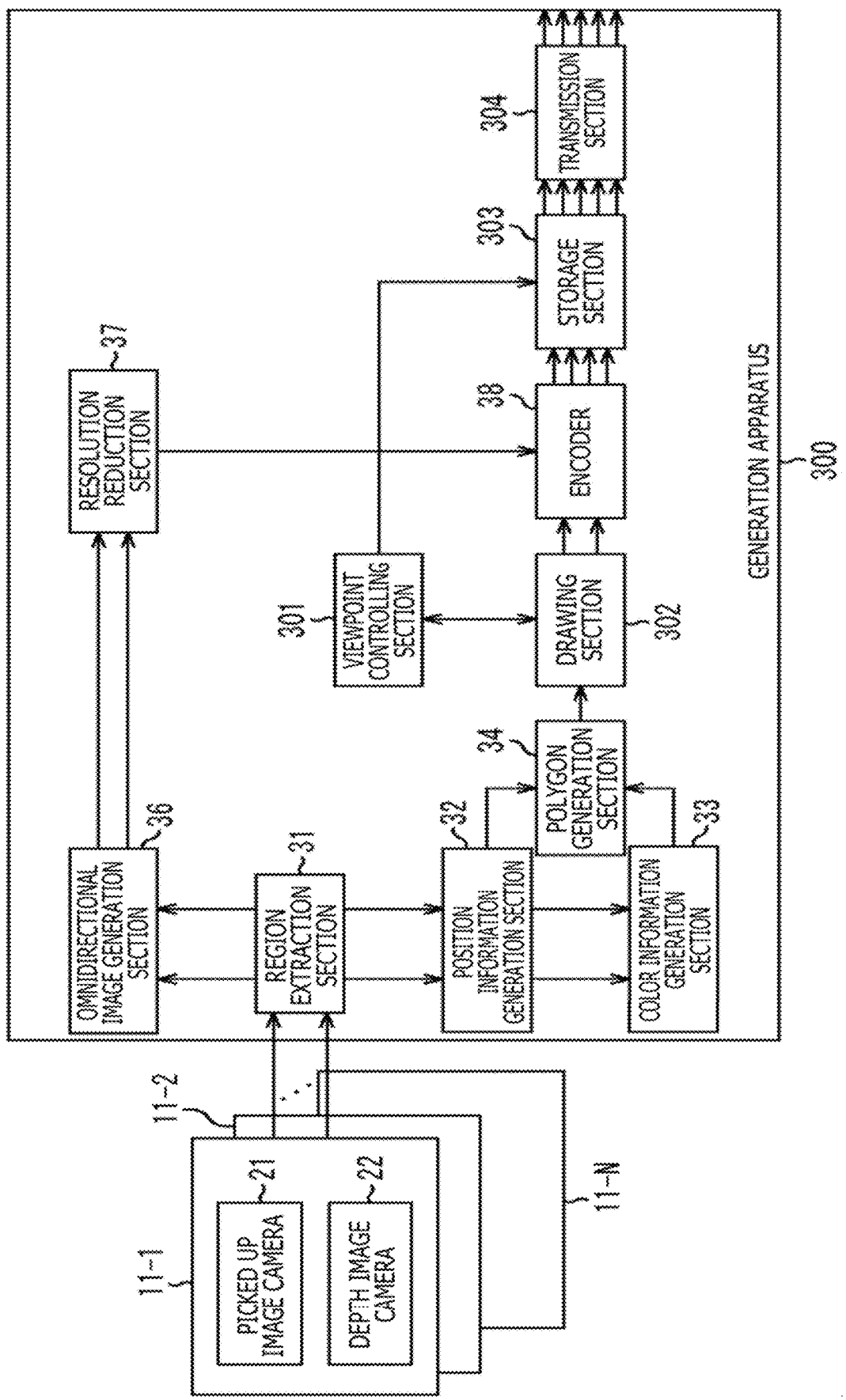
FIG. 16 is a block diagram depicting a configuration example of a second embodiment of a generation apparatus as an image processing apparatus to which the present disclosure is applied.

FIG. 16 is a block diagram depicting a configuration example of a second embodiment of the generation apparatus as an information processing apparatus to which the present disclosure is applied.

From among components depicted in FIG. 16, like components to those of FIG. 1 are denoted by like reference characters. Overlapping description is suitably omitted.

The configuration of the generation apparatus 300 of FIG. 16 is different from the configuration of the generation apparatus 12 of FIG. 1 in that a viewpoint controlling section 301 is provided newly and that a drawing section 302, a storage section 303, and a transmission section 304 are provided in place of the drawing section 35, the storage section 39, and the transmission section 40. In the generation apparatus 300, the positions of two viewpoints are variable, and the positions of two viewpoints are set such that texture images and depth images of the two viewpoints represent a three-dimensional structure of a greatest number of regions of polygons of a main imaging object.

In particular, the viewpoint controlling section 301 (viewpoint information generation section) rotates a straight line, which interconnects a current pair of two viewpoints opposed to each other across the origin of the 3D model coordinate system and passes the origin, successively by a predetermined amount in a predetermined direction around the origin within a predetermined range to determine a plurality of candidates for a pair of two viewpoints including the current pair of two viewpoints. A generation frequency of candidates for a pair of two viewpoints is not particularly restricted and can be determined for each frame, for each sequence, for each GOP (Group of Picture) or the like. The viewpoint controlling section 301 generates viewpoint information representative of three-dimensional coordinates of a plurality of candidates for a pair of two viewpoints and supplies the viewpoint information to the drawing section 302.

Further, in a case where the candidate for a pair of two viewpoints corresponding to viewpoint information supplied from the drawing section 302 is not the current pair of two viewpoints, the viewpoint controlling section 301 changes the current pair of two viewpoints to the candidate for a pair of two viewpoints and generates a table including the viewpoint information of the pair of two viewpoints. The viewpoint controlling section 301 outputs the table to the storage section 303.

In the case where a plurality of pieces of viewpoint information are supplied from the viewpoint controlling section 301, the drawing section 302 (image generation section) perspectively projects, for each piece of viewpoint information, the rear face of each polygon generated by the polygon generation section 34 for each viewpoint of the candidates for a pair of two viewpoints whose three-dimensional coordinates are indicated by the viewpoint information to a perspective projection face to generate texture images of the candidates for a pair of two viewpoints.

Then, the drawing section 302 selects, from among the candidates for a pair of two viewpoints, a candidate for a pair of two viewpoints in which the region of the rear face of a polygon perspectively projected upon generation of a texture image is greatest as an optimum pair of two viewpoints. In particular, the drawing section 302 selects, from among the candidates for a pair of two viewpoints, a pair of two viewpoints in which the number of polygons whose rear face is perspectively projected is greatest when texture images of two viewpoints are generated as an optimum pair of two viewpoints.

The drawing section 302 retains viewpoint information of the optimum pair of two viewpoints as viewpoint information of the current pair of two viewpoints and supplies the viewpoint information to the viewpoint controlling section 301. Further, the viewpoint controlling section 301 determines the texture images of the optimum pair of two viewpoints as final texture images of a current pair of two viewpoints.

Conversely, in a case where a plurality of pieces of viewpoint information are not supplied from the viewpoint controlling section 301, the drawing section 302 perspectively projects the rear face of each polygon for each viewpoint of the current pair of two viewpoints whose three-dimensional coordinates are indicated by the retained viewpoint information to a perspective projection face to generate texture images of the current pair of two viewpoints.

The drawing section 302 generates, on the basis of each polygon, depth images individually corresponding to the texture images of the current pair of two viewpoints. The drawing section 302 supplies the texture images and the depth images of the current pair of two viewpoints to the encoder 38.

The storage section 303 stores the viewpoint texture streams and the viewpoint depth streams of two viewpoints and the omnidirectional texture stream and the omnidirectional depth stream supplied from the encoder 38. Further, the storage section 303 stores the table supplied from the viewpoint controlling section 301.

The transmission section 304 reads out and transmits the viewpoint texture streams and the viewpoint depth streams of two viewpoints, the omnidirectional texture stream and the omnidirectional depth stream, and the table stored in the storage section 39.

(Description of Relationship Between Two Viewpoints and Region Capable of Representing Three-Dimensional Structure)

Figure 17:
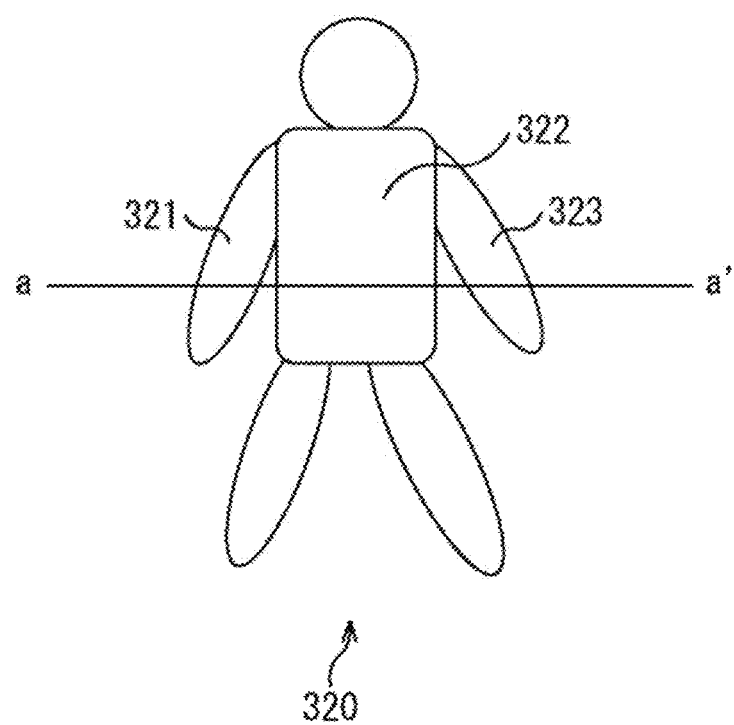
FIG. 17 is a view illustrating a relationship between two viewpoints and a region capable of representing a three-dimensional structure.
Figure 18A:
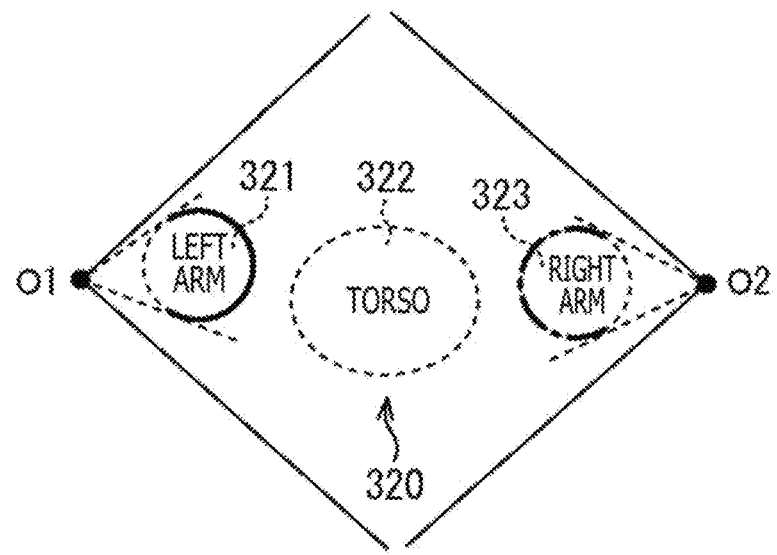
FIGS. 18A and 18B are views illustrating a relationship between two viewpoints and a region capable of representing a three-dimensional structure.
Figure 18B:
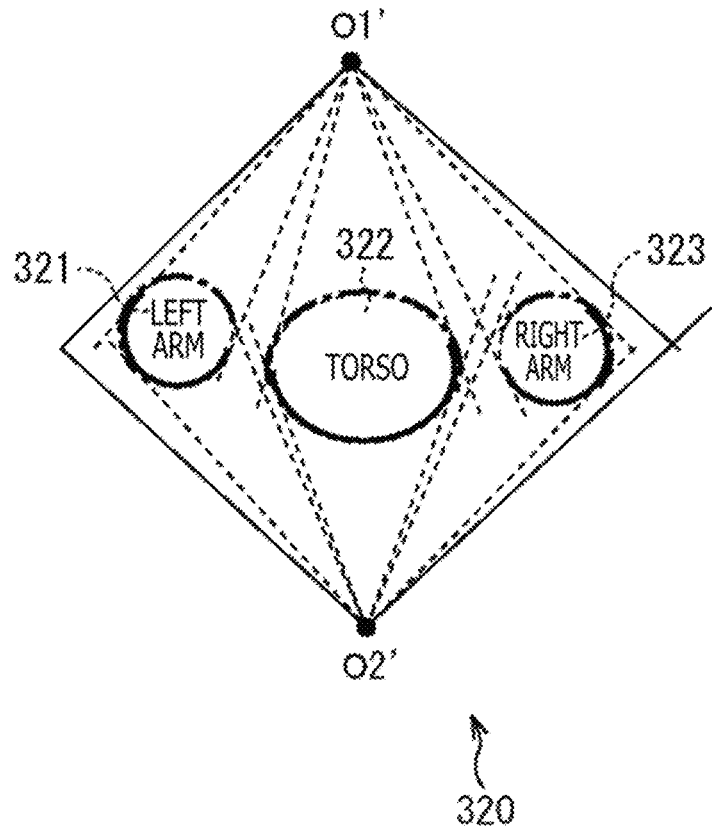

FIGS. 17, 18A, and 18B are views illustrating a relationship between two viewpoints and a region capable of representing a three-dimensional structure.

In a case where a polygon of a main imaging object forms a robot 320 of FIG. 17, a schematic view taken along an aa' cross section that is horizontal with respect to an installation face for the robot 320 is such as depicted in FIGS. 18A and 18B. In particular, the aa' cross section of the robot 320 includes a left arm 321, a torso 322, and a right arm 323 of the robot 320.

In this case, when one viewpoint O1 from between the two viewpoints is disposed on the left side of the left arm 321 on the aa' cross section and the other viewpoint O2 is disposed on the right side of the right arm 323 as depicted in FIG. 18A, then the rear face of the right side of the left arm 321 is perspectively projected to the texture image of the viewpoint O1. Meanwhile, the rear face of the left side of the right arm 323 is perspectively projected to the texture image of the viewpoint O2.

However, not only in the texture image of the viewpoint O1 but also in the texture image of the viewpoint O2, the rear face of the torso 322 is blocked by the left arm 321 or the right arm 323 existing in front and is not perspectively projected.

In contrast, when the viewpoint O1' from between the two viewpoints is disposed on the upper side of the left arm 321, the torso 322, and the right arm 323 on the aa' cross section and the other viewpoint O2' is disposed on the lower side as depicted in FIG. 18B, then to the texture image of the viewpoint O1', the rear face on the lower side of each of the left arm 321, torso 322 and right arm 323 is perspectively projected. Meanwhile, to the texture image of the viewpoint O2', the rear face on the upper side of each of the left arm 321, the torso 322, and the right arm 323 is perspectively projected.

As described above, in a case where a polygon of a main imaging object is configured from polygons of a plurality of portions, when polygons of different portions are lined up in the depth direction of each of the two viewpoints, then the region of the polygon of the main imaging object that is perspectively projected to the texture images of the two viewpoints decreases. Further, though not depicted, in a case where the shape of a polygon of a main imaging object is a recessed shape, when the opposite end portions between which a cavity is held in the depth directions of the two viewpoints, then since the end portion in front blocks the end portion in the back, the region of the polygon of the main imaging object to be perspectively projected to the texture images of the two viewpoints decreases.

Accordingly, the drawing section 302 generates texture images of two viewpoints for a plurality of candidates for a pair of two viewpoints and selects a candidate for a pair of two viewpoints in which the region of the rear face of the polygon to be perspectively projected is greatest as an optimum pair.

(Description of First Determination Method of Candidate for Pair of Two Viewpoints)

Figure 19:
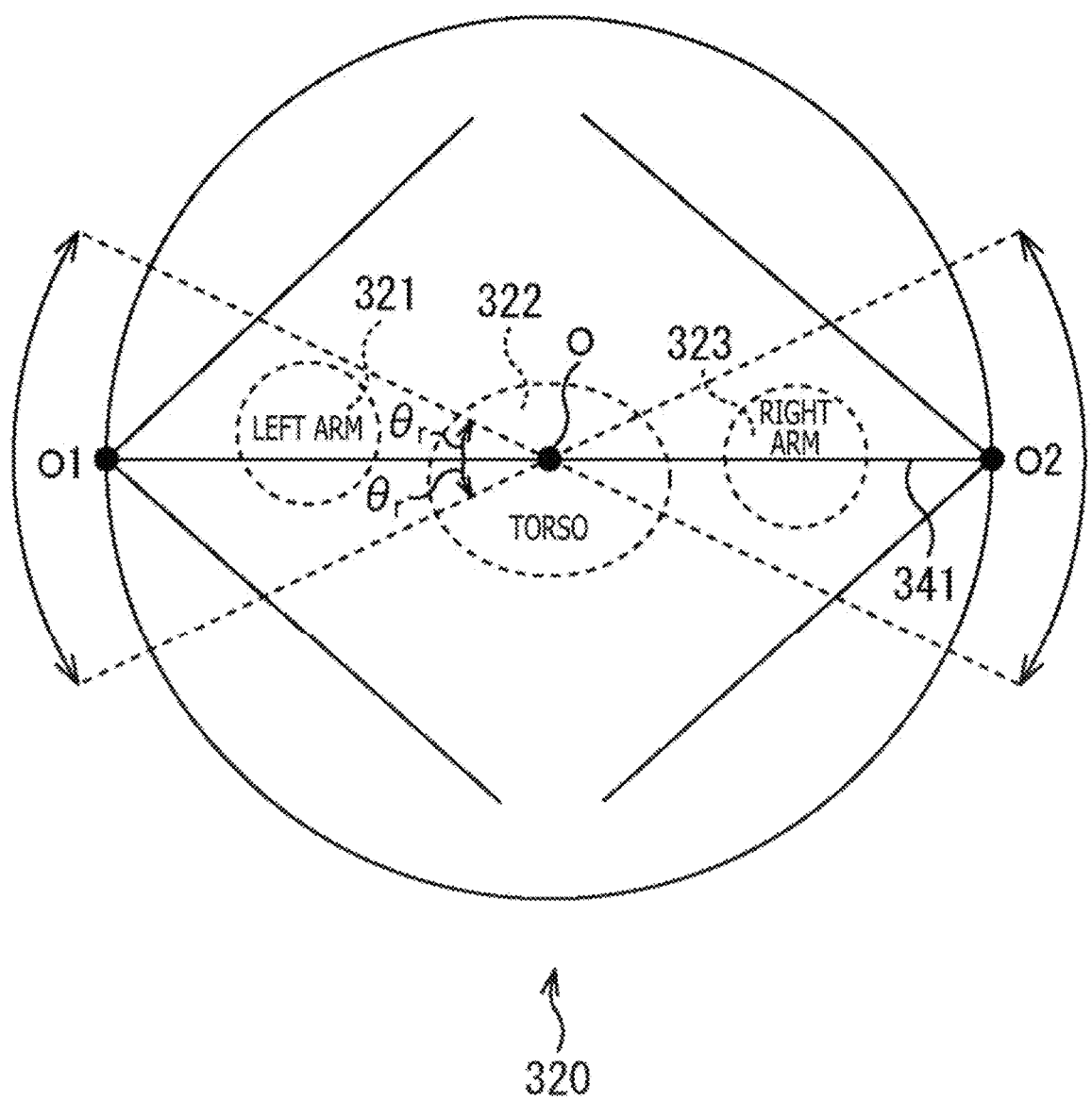
FIG. 19 is a view illustrating a first determination method of candidates for a pair of two viewpoints.

FIG. 19 is a view illustrating a first determination method of a candidate for a pair of two viewpoints.

In the example of FIG. 19, a polygon of a main imaging object forms the robot 320 of FIG. 17. Further, the viewpoint O1 from between the current pair of two viewpoints is on the left side of the left arm 321 on the aa' cross section of FIG. 17, and the other viewpoint O2 is on the right side of the right arm 323 on the aa' cross section of FIG. 17. They are similar to those also in FIG. 20 hereinafter described.

As depicted in FIG. 19, in the first determination method, the viewpoint controlling section 301 rotates a straight line 341, which interconnects the viewpoint O1 and the viewpoint O2 and passes the origin O, successively by a predetermined amount in one direction around the origin O within a predetermined range to determine candidates for a pair of two viewpoints including the current pair of two viewpoints. In particular, in the first determination method, a candidate for a pair of two viewpoints moves on a circle centered at the origin O and having the straight line 341 as a diameter.

In the example of FIG. 19, the viewpoint controlling section 301 rotates the straight line 341 within a range of a very small angle θr successively by a predetermined amount in the clockwise direction or in the counterclockwise direction in a direction parallel to the aa' cross section to determine candidates for a pair of two viewpoints including the current pair of two viewpoints.

(Description of Second Determination Method of Candidates for Pair of Two Viewpoints)

Figure 20:
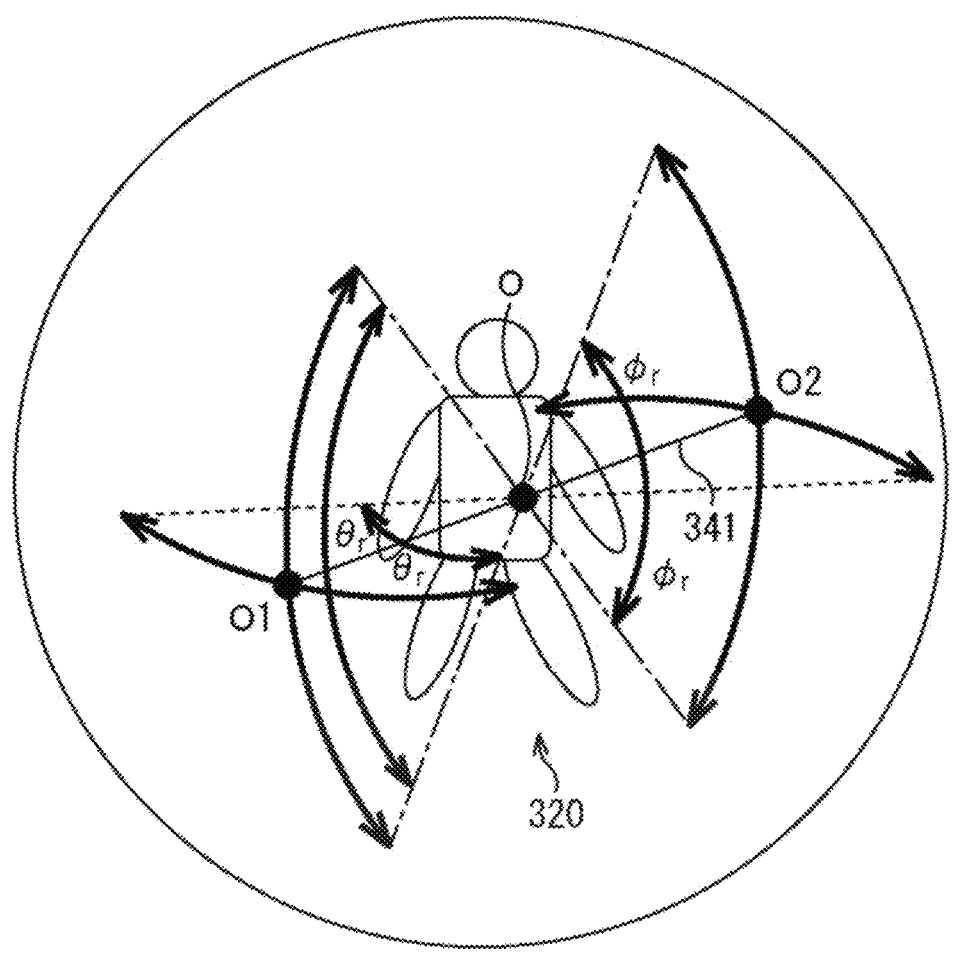
FIG. 20 is a view illustrating a second determination method of candidates for a pair of two viewpoints.

FIG. 20 is a view illustrating a second determination method of candidates for a pair of two viewpoints.

As depicted in FIG. 20, according to the second determination method, the viewpoint controlling section 301 determines candidates for a pair of two viewpoints including the current pair of two viewpoints by rotating the straight line 341 successively by a predetermined amount in two or more directions within a predetermined range around the origin O. In particular, in the second determination method, candidates for a pair of two viewpoints move on a spherical face centered at the origin O and having the straight line 341 as a diameter.

In the example of FIG. 20, the viewpoint controlling section 301 determines candidates for a pair of two viewpoints by rotating the straight line 341 successively by a predetermined amount in the clockwise direction or in the counterclockwise direction within the range of the very small angle θr in a direction parallel to the aa' cross section. Further, the viewpoint controlling section 301 determines candidates for a pair of two viewpoints by rotating the straight line 341 successively by a predetermined amount in the clockwise direction or in the counterclockwise direction within the range of a very small angle φr in a direction perpendicular to the aa' cross section.

As described above, in the first and second determination methods, the viewpoint controlling section 301 determines candidates for a pair of two viewpoints by rotating the straight line 341 interconnecting the viewpoint O1 and the viewpoint O2 at present within the range of a very small angle. Accordingly, the pair of two viewpoints varies stepwise such that the region of the rear face of a polygon to be perspectively projected increases. Therefore, even in a case where a pair of two viewpoints is to be determined in a unit of a frame, the pair of two viewpoints does not vary by a great amount between frames. As a result, deterioration of the encoding efficiency of texture images and depth images caused by a great variation of the pair of two viewpoints between frames can be prevented.

(Example of Table)

FIG. 21 is a view depicting an example of a table generated by the viewpoint controlling section 301 of FIG. 16.

As depicted in FIG. 21, into the table, viewpoint information and an azimuth angle and an elevation angle that indicate a sight line direction are registered for each viewpoint.

The azimuth angle is an angle in an XZ plane direction defined by a sight line direction and the Z axis, and an elevation angle is an angle defied by the sight line direction and the XZ plane. A line when a vector in the positive direction of the Z axis extending from the viewpoint is horizontally rotated by an azimuth angle on the XZ plane and then rotated upwardly or downwardly in the Y axis direction by an elevation angle represents the sight line direction.

In the example of FIG. 21, the Z axis direction of the 3D model coordinate system is a direction heading from one to the other of the two viewpoints. Accordingly, the azimuth angle and the elevation angle at one viewpoint from between the two viewpoints are 0 degrees, and the viewpoint information is three-dimensional coordinates (0, 0, −1.0). Further, the azimuth angle of the other viewpoint is −180 degrees, and the three-dimensional coordinates are (0, 0, 1.0).

Further, into the table, a rotation angle that is an angle in the rotation direction of the perspective projection face around the sight line direction for each viewpoint is registered. Furthermore, into the table, for each viewpoint, a transverse field angle that is a field angle in the transverse direction and a vertical field angle that is a field angle in the vertical direction as well as a transverse pixel number that is a pixel number in the transverse direction and a vertical pixel number that is a pixel number in the vertical direction of a texture image of the viewpoint are registered. In the example of FIG. 21, both of the rotation angles of the two viewpoints are each 0 degrees; the transverse field angles and the vertical field angles of the two viewpoints are each 90 degrees; and the transverse pixel numbers and the vertical pixel numbers of the two viewpoints are each 1024.

(Description of Processing of Image Processing Apparatus)

Figure 22:
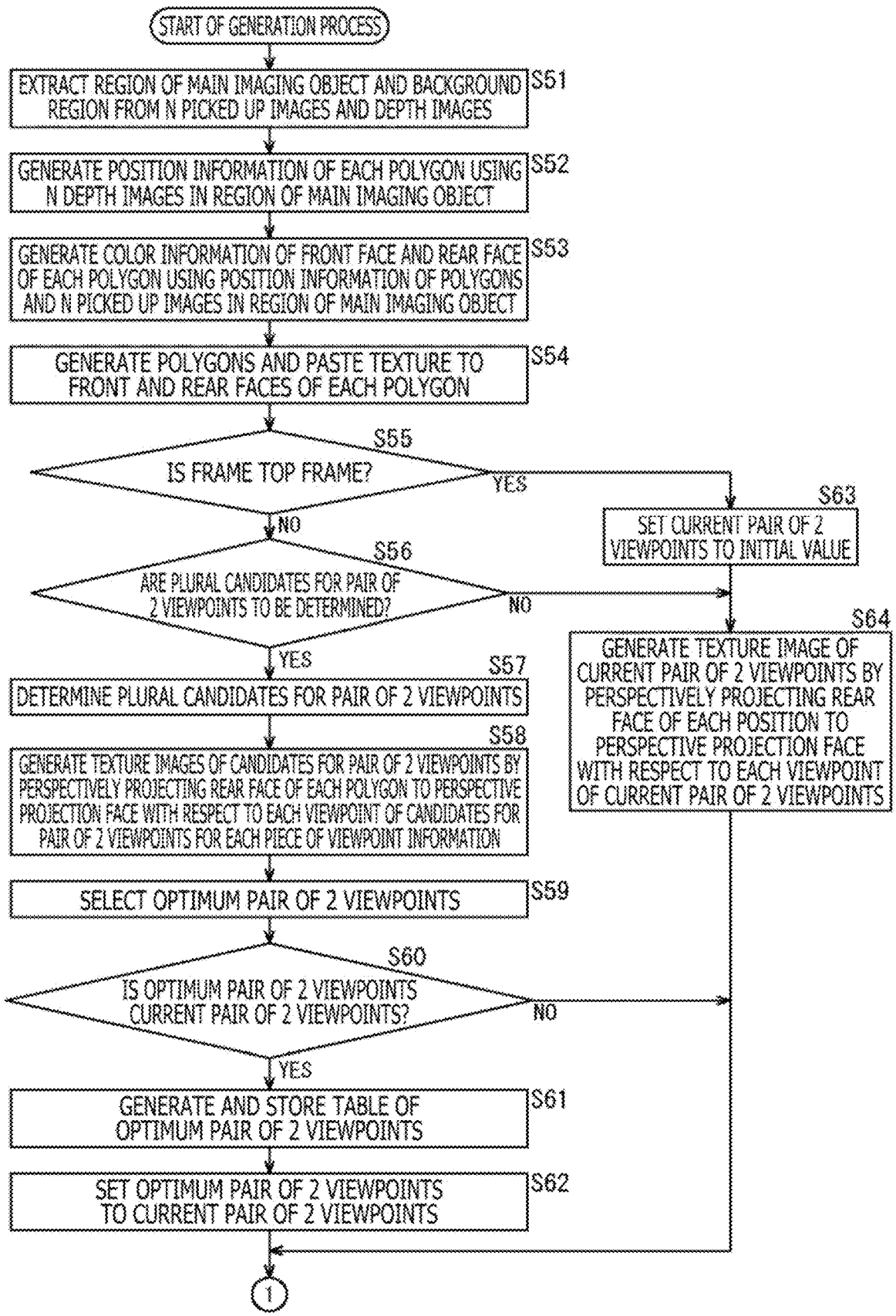
FIG. 22 is a flow chart illustrating a generation process of the generation apparatus of FIG. 16.
Figure 23:
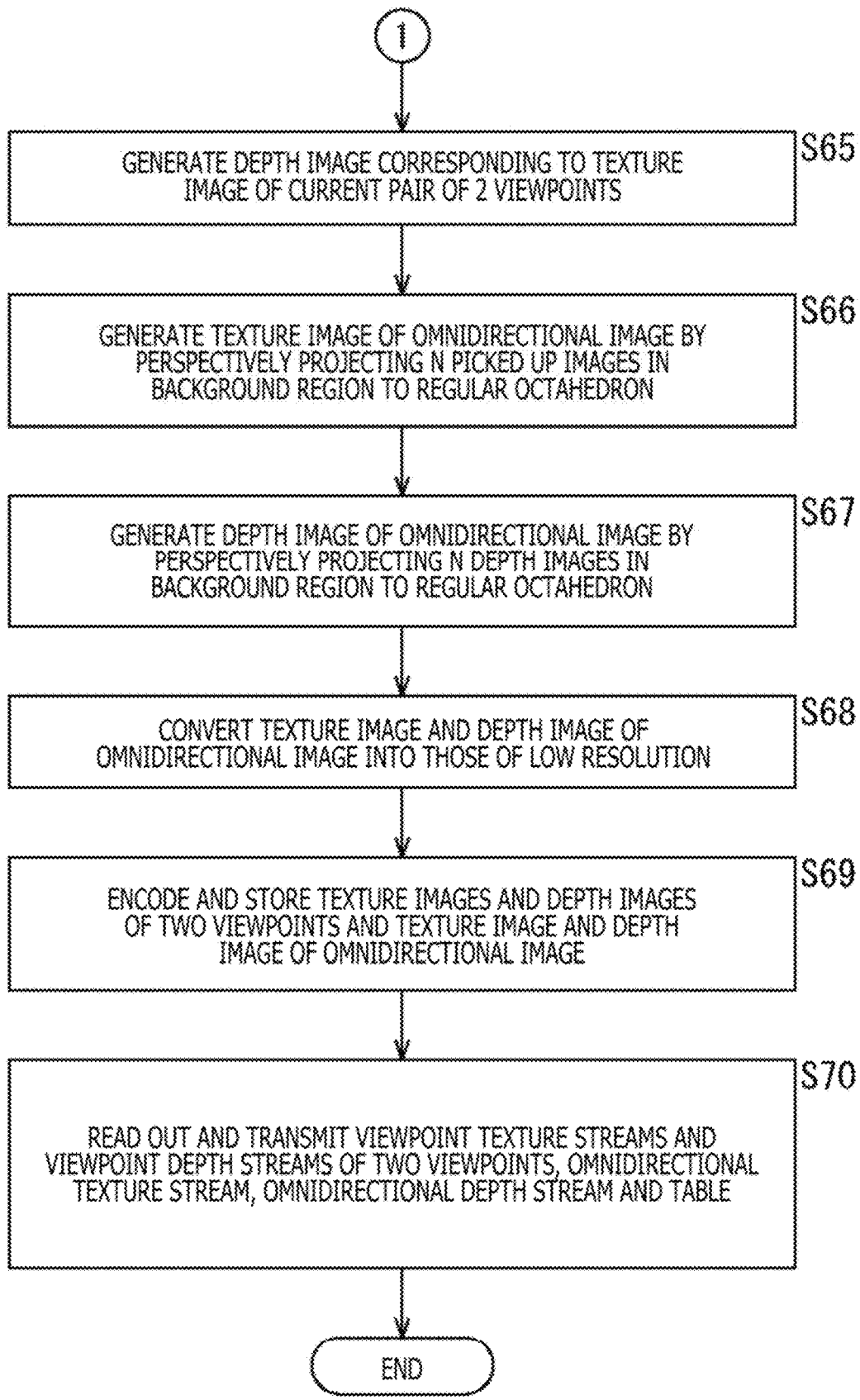
FIG. 23 is a flow chart illustrating the generation process of the generation apparatus of FIG. 16.

FIGS. 22 and 23 are flow charts illustrating a generation process of the generation apparatus 300 of FIG. 16. This generation process is performed for each of frames of N picked up images and depth images acquired by the n imaging apparatus 11.

Processes at steps S51 to S54 of FIG. 22 are similar to the processes at steps S11 to S14 of FIG. 11.

At step S55, the viewpoint controlling section 301 decides whether or not the frame of the processing target is the top frame. In a case where it is decided at step S55 that the frame of the processing target is not the top frame, namely, in a case where a current pair of two viewpoints is set already, the processing advances to step S56.

At step S56, the viewpoint controlling section 301 decides on the basis of the generation frequency of candidates for a pair of two viewpoints, namely, on the basis of the update frequency of a pair of two viewpoints, whether or not a plurality of candidates for a pair of two viewpoints are to be determined. For example, in a case where the generation frequency of a candidate for a pair of two viewpoints is a unit of a frame, the viewpoint controlling section 301 decides that a plurality of candidates for a pair of two viewpoints are to be determined constantly. Alternatively, in a case where the generation frequency of a candidate for a pair of two viewpoints is a unit of a sequence or a unit of a GOP, when the frame of the processing target is the top frame of a sequence or a GOP, the viewpoint controlling section 301 decides to determine a plurality of candidates for a pair of two viewpoints.

In a case where it is decided at step S56 that a plurality of candidates for a pair of two viewpoints are to be determined, the processing advances to step S57. At step S57, the viewpoint controlling section 301 determines a plurality of candidates for a pair of two viewpoints by the first or second determination method. The viewpoint controlling section 301 generates and supplies viewpoint information of the plurality of candidates for a pair of two viewpoints to the drawing section 302.

At step S58, the drawing section 302 perspectively projects, for each piece of the viewpoint information, the rear face of each polygon to a perspective projection face with respect to each of the viewpoints of candidates for a pair of two viewpoints whose three-dimensional coordinates are indicated by the piece of viewpoint information to generate texture images of the candidates for a pair of two viewpoints.

At step S59, the drawing section 302 selects, from among the candidates for a pair of two viewpoints, the candidate for a pair of two viewpoints in which the region of the rear face of a polygon to be perspectively projected when a texture image is to be generated is greatest as optimum pair of two viewpoints. The drawing section 302 retains the viewpoint information of the optimum pair of two viewpoints as viewpoint information of the current pair of two viewpoints and supplies the viewpoint information to the viewpoint controlling section 301. Further, the viewpoint controlling section 301 determines texture images of the optimum pair of two viewpoints as texture images of a final current pair of two viewpoints.

At step S60, the viewpoint controlling section 301 decides whether the final pair of two viewpoints corresponding to the viewpoint information supplied from the drawing section 302 is the current pair of two viewpoints. In a case where it is decided at step S60 that the final pair of two viewpoints is not the current pair of two viewpoints, the processing advances to step S61.

At step S61, the viewpoint controlling section 301 generates a table including the viewpoint information supplied from the drawing section 302 and supplies the table to the storage section 303 so as to be stored.

At step S62, the viewpoint controlling section 301 sets the optimum pair of two viewpoints to the current pair of two viewpoints, and advances the processing to step S65 in FIG. 23.

Conversely, in a case where it is decided at step S55 that the frame of the processing target is the top frame, namely, in a case where a current pair of two viewpoints is not set as yet, the processing advances to step S63.

At step S63, the viewpoint controlling section 301 sets the current pair of two viewpoints to an initial value, and advances the processing to step S64.

Conversely, in a case where it is decided at step S56 that a plurality of candidates for a pair of two viewpoints are not to be determined, the drawing section 302 perspectively projects the rear face of each polygon to the perspective projection face with respect to each of the viewpoints of the current pair of two viewpoints whose three-dimensional coordinates are represented by the retained viewpoint information to generate texture images of the current pair of two viewpoints. Then, the processing advances to step S65 of FIG. 23.

Conversely, in a case where it is decided at step S60 that the optimum pair of two viewpoints is not the current pair of two viewpoints, since there is no necessity to change the current pair of two viewpoints, the processing skips steps S61 and S62 and advances to step S65 of FIG. 23.

At step S65 of FIG. 23, the drawing section 302 generates, on the basis of the polygons, depth images individually corresponding to the texture images of the current pair of two viewpoints. The drawing section 302 supplies the texture images and the depth images of the current pair of two viewpoints to the encoder 38.

Since processes at steps S66 to S69 are similar to the processes at steps S17 to S20 of FIG. 11, description of them is omitted.

At step S70, the transmission section 304 reads out and transmits the viewpoint texture streams and the viewpoint depth streams of two viewpoints, the omnidirectional texture stream and the omnidirectional depth stream, and the table from the storage section 39. Then, the processing ends.

In this manner, the generation apparatus 300 determines a pair of two viewpoints such that texture images and depth images of two viewpoints can represent three-dimensional structures of a greater number of regions. Accordingly, three-dimensional structures of a greater number of regions can be represented using texture images and depth images of two viewpoints.

The configuration of the display apparatus in the second embodiment is same as the configuration of the display apparatus 200 of FIG. 12 except that a table is used upon reconstruction by the reconstruction section 204. In particular, since, in the second embodiment, the pair of two viewpoints does not have fixed values determined in advance, the reconstruction section 204 generates, upon reconstruction, three-dimensional coordinates (X, Y, Z) of sampling points using viewpoint information and sight line information of the viewpoints of the pair of two viewpoints registered in the table.

It is to be noted that, while, in the first and second embodiments, only the rear face of a polygon of a main imaging object is perspectively projected to a texture image, also a front face of a polygon of a background region may be perspectively projected to a texture image.

<Different Generation Method of Texture Image>

Figure 24:
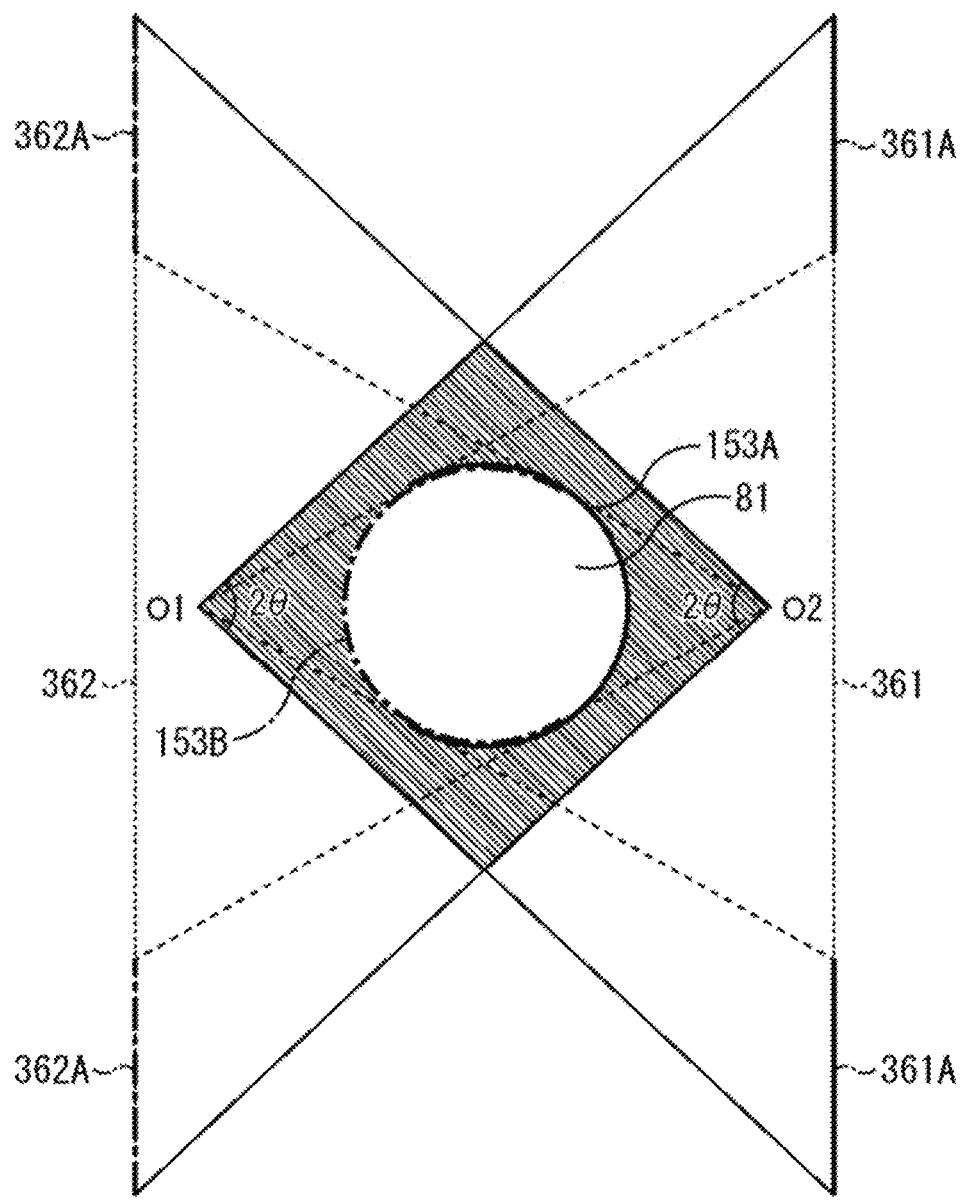
FIG. 24 is a view illustrating a different generation method of a texture image.

FIG. 24 is a view illustrating a generation method of a texture image in this case.

In the example of FIG. 24, a sphere 81 of a main imaging object is formed.

In this case, in addition to the polygon that forms the sphere 81, a polygon of a background region 361 is generated at a position at which the position of the viewpoint O1 in the depth direction is on the back side farther than that of the sphere 81, and a polygon of a background region 362 is generated at a position at which the position of the viewpoint O2 in the depth direction is on the back side farther than that of the sphere 81. For the generation of the polygons of the background region 361 and the background region 362, N picked up images and depth images in the background region extracted by the region extraction section 31 are used.

Further, for each of the viewpoints, the rear face of the polygon forming the sphere 81 and the front face of each of the polygons of the background region 361 and the background region 362 are perspectively projected to generate a texture image.

As a result, as depicted in FIG. 24, on the texture image of the viewpoint O1, a region 153A of the rear face of the sphere 81 included in the field angle 2θ of the viewpoint O1 and a region 361A that is not blocked by the region 153A from within a front face of a background region 361 are drawn. Further, on the texture image of the viewpoint O2, a region 153B of the rear face of the sphere 81 included in the field angle 2θ of the viewpoint O2 and a region 362A that is not blocked by the region 153B from within a front face of the background region 362 are drawn.

In a case where a texture image is generated in such a manner as described above, the display apparatus 200 can generate a background region of a display image with high accuracy in comparison with an alternative case in which only the rear face of a polygon of a main imaging object is perspectively projected to the texture image. Further, also it is possible for the display apparatus 200 to delete the background region from a display image by drawing only three-dimensional structures existing within the field angle 2θ of both of the viewpoint O1 and the viewpoint O2. It is to be noted that, in this case, the generation apparatus 12 (300) may not generate an omnidirectional texture stream and an omnidirectional depth stream.

<Different Example of Texture Image>

Figure 25A:
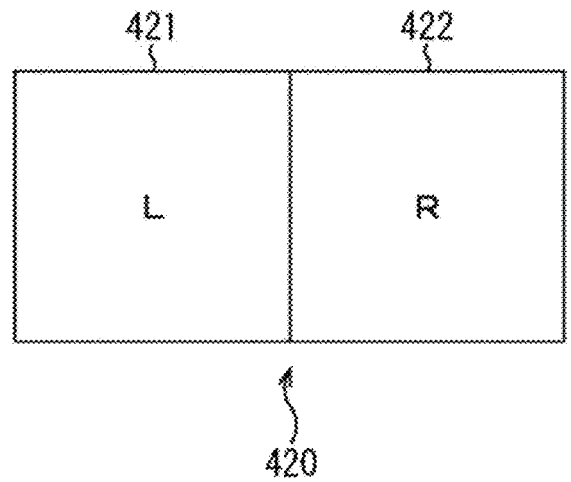
FIGS. 25A and 25B are views depicting a different example of a texture image.
Figure 25B:
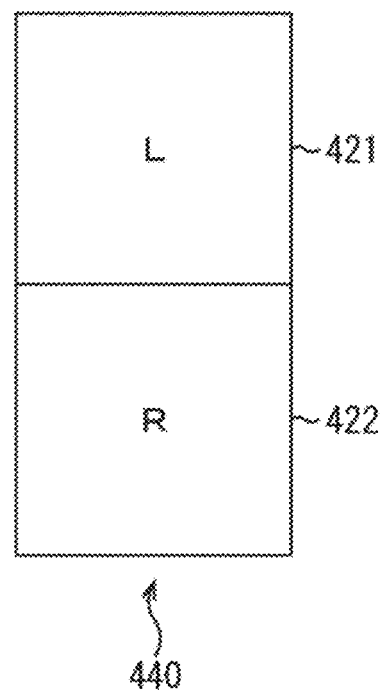

FIGS. 25A and 25B are views depicting a different example of a texture image.

Although, in the foregoing description, the texture image is a texture image of one viewpoint, it may be a composite of texture images of a viewpoint for the left eye and a viewpoint for the right eye corresponding to the viewpoint.

In particular, as depicted in FIG. 25A, the texture image may be, for example, a packed image 420 in which a texture image 421 of a viewpoint for the left eye and another texture image 422 of a viewpoint for the right eye that correspond to one viewpoint are packed in a transverse direction (horizontal direction).

Alternatively, as depicted in FIG. 25B, the texture image may be, for example, a packed image 440 in which a texture image 421 and another texture image 422 are packed in a longitudinal direction (vertical direction).

In a case where the texture image is a texture image in which images of a viewpoint for the left eye and a viewpoint for the right eye are packed as described above, the texture image obtained as a result of decoding is separated into the texture image of the viewpoint for the left eye and the texture image of the viewpoint for the right eye. Then, a three-dimensional structure is generated for each eye.

Then, a display image for the left eye is generated from the three-dimensional structure for the left eye on the basis of the viewpoint of the left eye corresponding to the viewpoint designated by the viewer or the like, the sight line direction, and the field angle. Meanwhile, a display image for the right eye is generated from the three-dimensional structure for the right eye on the basis of the viewpoint of the right eye corresponding to the viewpoint designated by the viewer or the like, the sight line direction, and the field angle.

In the case where the display section 206 is 3D displayable, the display section 206 displays a display image for the left eye as an image for the left eye and displays a display image for the right eye as an image for the right eye to 3D display a display image. On the other hand, in the case where the display section 206 is not 3D displayable, the display section 206 2D displays the display image for the left eye or the display image for the right eye.

It is to be noted that, while the number of viewpoints is two in the first and second embodiments, the number of viewpoints is not limited to two. Further, the two viewpoints may not be opposed to each other. The sight line direction may be a direction from the viewpoint to a position other than the origin.

Further, the generation apparatus 12 (300) may read out viewpoint texture streams and viewpoint depth streams of two viewpoints as well as an omnidirectional stream and an omnidirectional depth stream stored in the storage section 39 (303) and transmit them to the display apparatus 200 only when a request is received from the display apparatus 200. This similarly applies also to transmission of the table.

Furthermore, also in the first embodiment, the generation apparatus 12 may generate a table including viewpoint information of two viewpoints determined in advance and transmit the table to the display apparatus 200 similarly as in the second embodiment.

Third Embodiment

The configuration of a third embodiment of a distribution system to which the present disclosure is applied is same as the configuration described above, for example, of the generation apparatus 12 of FIG. 1 or the display apparatus 200 depicted in FIG. 12 except that tan axis projection (details are hereinafter described) is performed in place of perspective projection. Accordingly, in the following, description is given only of tan axis projection.

(Description of Coordinate System of Projection Face)

Figure 26:
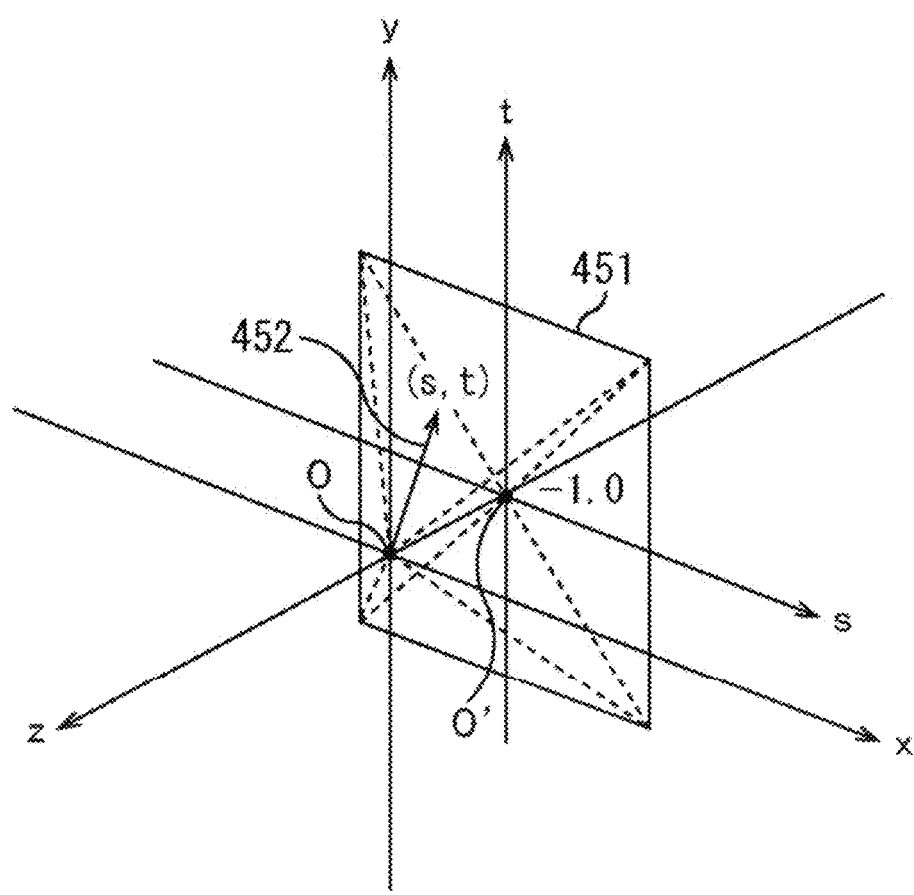
FIG. 26 is a view illustrating a coordinate system of a projection face.

FIG. 26 is a view illustrating a coordinate system of a projection face.

It is to be noted that, in the third embodiment, the projection face is a two-dimensional plane to which, when the generation apparatus 12 generates a high resolution image, an omnidirectional image mapped to a sphere is tan axis projected or a viewing range in which, when the display apparatus 200 generates a display image, a 3D model image is tan axis projected.

In the example of FIG. 26, a projection face 451 whose z is −1.0 is set in a three-dimensional xyz coordinate system of a 3D model. In this case, a two-dimensional st coordinate system in which the center O' of the projection face 451 is the origin and the horizontal direction of the projection face 451 is an s direction while the vertical direction is a t direction is a coordinate system of the projection face 451.

It is to be noted that, in the following description, a vector 452 heading from the origin O of the xyz coordinate system to coordinates (s, t) of the st coordinate system is referred to as vector (s, t, −1.0) using the coordinates (s, t) and −1.0 that is the distance from the origin O to the projection face 451.

(Description of Tan Axis Projection)

Figure 27:
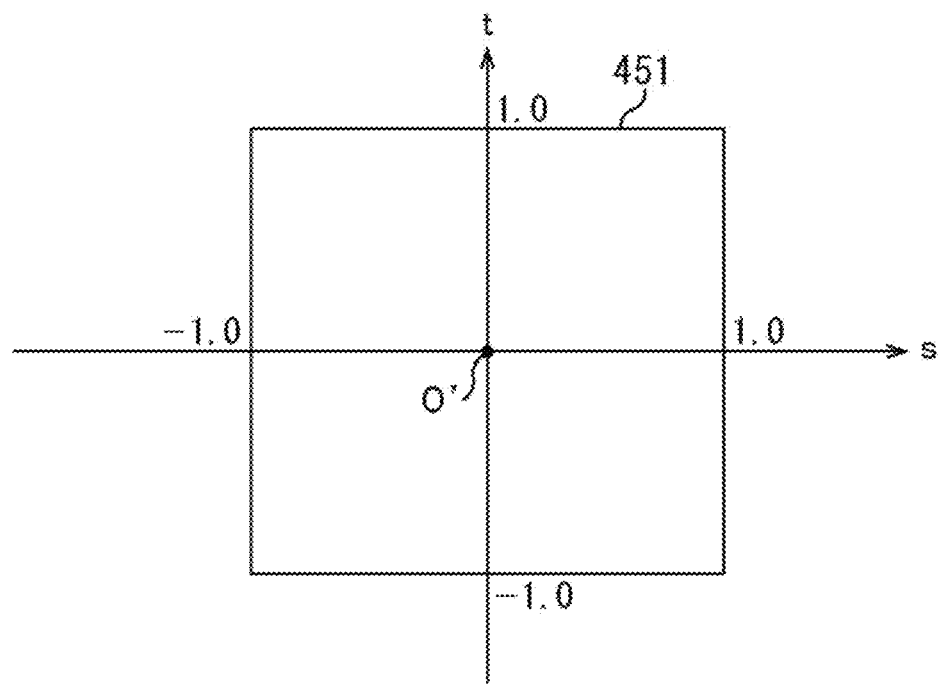
FIG. 27 is a view illustrating tan axis projection.

FIG. 27 is a view illustrating tan axis projection (tangential axis projection).

FIG. 27 is a view of the projection face 451 as viewed in the negative direction of z. In the example of FIG. 27, in the st coordinate system, the minimum values of the s value and the t value of the projection face 451 are −1.0, and the maximum values are 1.0.

In this case, in perspective projection, a projection point is set on the projection face 451 such that the projection vector heading from the origin O to the projection point on the projection face 451 becomes a vector (s', t', −1.0). It is to be noted that s' indicates a value at each of predetermined distances provided within a range of the s value from −1.0 to 1.0, and t' indicates a value at each of predetermined distances provided within a range of the t value from −1.0 to 1.0. Accordingly, projection points in perspective projection are uniform on the projection face 451.

In contrast, if the field angle of the projection face 451 is θw (in the example of FIG. 27, π/2), then in tan axis projection, a projection point is set on the projection face 451 such that the projection vector is a vector (tan(s'*w/2), tan(t'*θw/2), −1.0).

In particular, if s'*θw/2 is represented by θ and t'*θw/2 is represented by φ, then the vector (tan(s'*θw/2), tan(t'*θw/2), −1.0) becomes a vector (tan θ, tan φ, −1.0). At this time, if the field angle θw comes close to π, then tan θ and tan φ diverge to infinity. Accordingly, the vector (tan θ, tan φ, −1.0) is corrected to a vector (sin θ*cos φ, cos θ*sin φ, −cos θ*cos φ) such that tan θ and tan φ do not diverge to infinity, and a projection point is set on the projection face 451 such that the projection vector becomes the vector (sin θ*cos φ, cos θ*sin φ, −cos θ*cos φ). Accordingly, in tan axis projection, angles defined by every projection vectors corresponding to projection points neighboring with each other become equal.

It is to be noted that, similarly to a logarithmic axis (log scale), tan(s'*θw/2) and tan(t'*θw/2) are grasped as s' and t' of the tan axis. Accordingly, in the present specification, projection where the projection vector is the vector (tan (s'*θw/2), tan(t'*θw/2), −1.0) is referred to as tan axis projection.

Fourth Embodiment (Description of Computer to which Present Disclosure is Applied)

While the series of processes described above can be executed by hardware, it may otherwise be executed by software. In a case where the series of processes is executed by software, a program that constitutes the software is installed into a computer. Here, the computer includes a computer incorporated in hardware for exclusive use, for example, a personal computer for universal use that can execute various functions by installing various programs, and the like.

Figure 28:
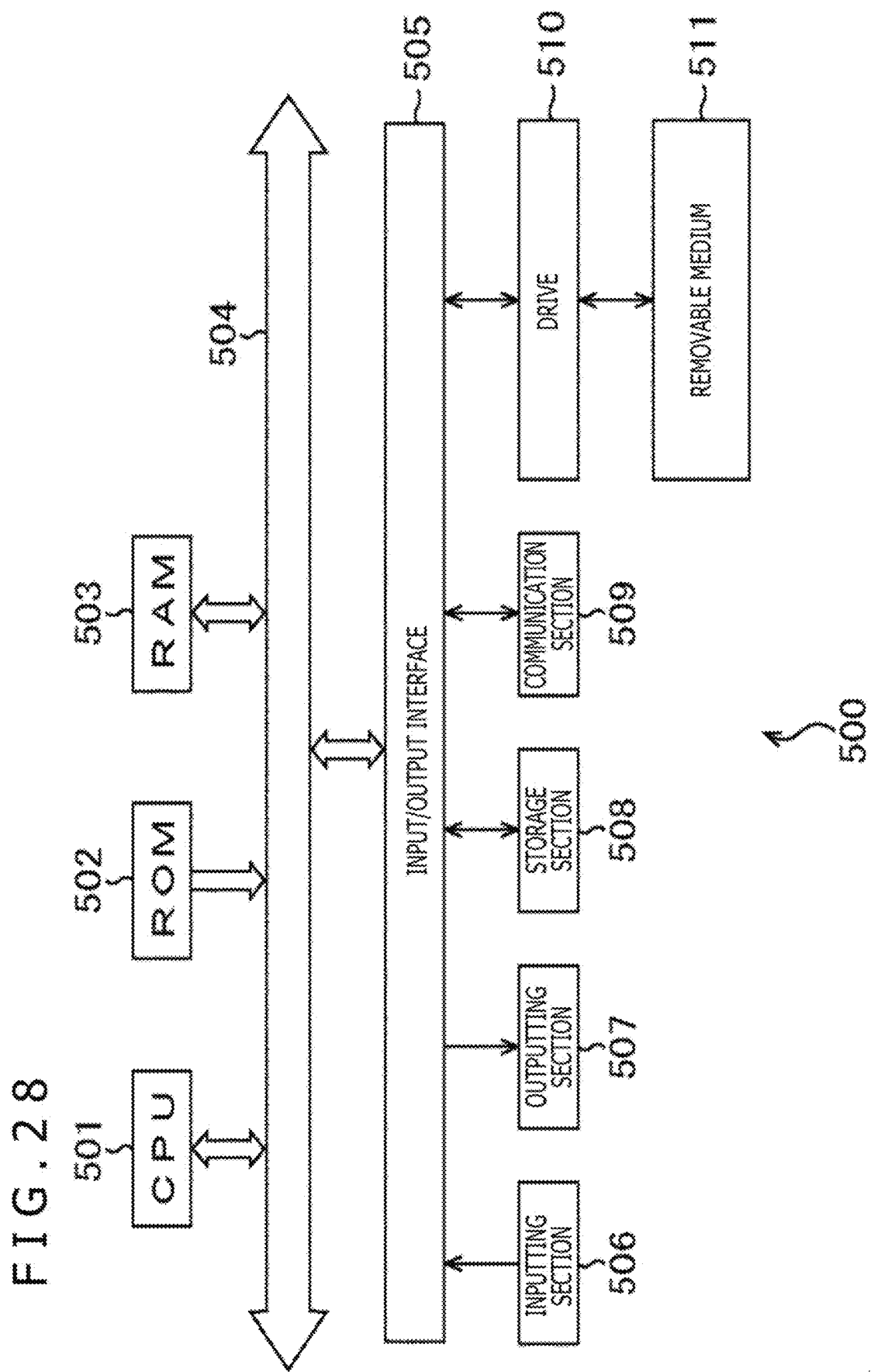
FIG. 28 is a block diagram depicting a configuration example of hardware of a computer.

FIG. 28 is a block diagram depicting a configuration example of hardware of a computer that executes the series of processes described hereinabove in accordance with a program.

In the computer 500, a CPU (Central Processing Unit) 501, a ROM (Read Only Memory) 502, and a RAM (Random Access Memory) 503 are connected to each other by a bus 504.

To the bus 504, an input/output interface 505 is connected further. To the input/output interface 505, an inputting section 506, an outputting section 507, a storage section 508, a communication section 509, and a drive 510 are connected.

The inputting section 506 includes a keyboard, a mouse, a microphone, and the like. The outputting section 507 includes a display, a speaker, and the like. The storage section 508 includes a hard disk, a nonvolatile memory, and the like. The communication section 509 includes a network interface or the like. The drive 510 drives a removable medium 511 such as a magnetic disk, an optical disk, a magneto-optical disk, a semiconductor memory, or the like.

In the computer 500 configured in such a manner as described above, the CPU 501 loads a program stored, for example, in the storage section 508 into the RAM 503 through the input/output interface 505 and the bus 504 to perform the series of processes described above.

The program that is executed by the computer 500 (CPU 501) can be recorded into and provided as the removable medium 511, for example, as a package medium or the like. Further, the program can be provided through a wired or wireless transmission medium such as a local area network, the Internet, a digital satellite broadcast, or the like.

In the computer 500, a program can be installed into the storage section 508 through the input/output interface 505 by mounting a removable medium 511 on the drive 510. Further, the program can be received by the communication section 509 through a wired or wireless transmission medium and installed into the storage section 508. Further, the program can be installed in advance into the ROM 502 or the storage section 508.

It is to be noted that the program executed by the computer 500 may be a program in which processes are performed in time series in accordance with the order described in the present specification or may be a program in which processes are executed in parallel or at a necessary timing such as, for example, when the program is called, or the like.

Application Example

The technology according to the present disclosure can be applied to various products. For example, the technology according to the present disclosure may be implemented as an apparatus that is incorporated in various types of mobile bodies such as automobiles, electric cars, hybrid electric cars, motorcycles, bicycles, personal mobilities, airplanes, drones, ships, robots, construction machines, agricultural machines (tractors), and the like.

FIG. 29 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 29, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 29 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 30 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 30 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 29, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 29, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 29 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

It is to be noted that a computer program for implementing the functions of the generation apparatus 12 (300) and the display apparatus 200 according to the present embodiments described hereinabove with reference to FIGS. 1, 2, 3A, 3B, 3C, 4A, 4B, 5, 6, 7, 8A, 8B, 8C, 9A, 9B, 10A, 10B, 11, 12, 13, 14, 15, 16, 17, 18A, 18B, 19, 20, 21, 22, 23, 24, 25A, 25B, 26, and 27 can be incorporated into some control unit or the like. Further, also it is possible to provide a computer-readable recording medium in which such a computer program as just described is stored. The recording medium may be, for example, a magnetic disk, an optical disk, a magneto-optical disk, a flash memory, or the like. Further, the computer program described above may be distributed, for example, through a network without using a recording medium.

In the vehicle control system 7000 described above, the generation apparatus 12 (300) and the display apparatus 200 according to the present embodiments described hereinabove with reference to FIGS. 1, 2, 3A, 3B, 3C, 4A, 4B, 5, 6, 7, 8A, 8B, 8C, 9A, 9B, 10A, 10B, 11, 12, 13, 14, 15, 16, 17, 18A, 18B, 19, 20, 21, 22, 23, 24, 25A, 25B, 26, and 27 can be applied. In this case, for example, the generation apparatus 12 (300) and the display apparatus 200 are integrated and correspond to the microcomputer 7610, the storage section 7690, and the display section 7720. Further, the imaging apparatus 11 corresponds to the imaging section 7410. In this case, for example, the vehicle control system 7000 can represent a three-dimensional structure of a greater number of regions using texture images and depth images of two viewpoints.

Further, at least part of the components of the generation apparatus 12 (300) and the display apparatus 200 described hereinabove with reference to FIGS. 1, 2, 3A, 3B, 3C, 4A, 4B, 5, 6, 7, 8A, 8B, 8C, 9A, 9B, 10A, 10B, 11, 12, 13, 14, 15, 16, 17, 18A, 18B, 19, 20, 21, 22, 23, 24, 25A, 25B, 26, and 27 may be implemented by a module for the vehicle control system 7000 depicted in FIG. 29 (for example, by an integrated circuit module configured by one die). As an alternative, the generation apparatus 12 (300) and the display apparatus 200 described with reference to FIGS. 1, 2, 3A, 3B, 3C, 4A, 4B, 5, 6, 7, 8A, 8B, 8C, 9A, 9B, 10A, 10B, 11, 12, 13, 14, 15, 16, 17, 18A, 18B, 19, 20, 21, 22, 23, 24, 25A, 25B, 26, and 27 may be implemented by a plurality of control units of the vehicle control system 7000 depicted in FIG. 29.

It is to be noted that the advantageous effects described herein are illustrative only and are not restrictive, and other advantages may be available.

Further, the embodiment of the present disclosure is not limited to the embodiments described hereinabove, and various alterations are possible without departing from the subject matter of the present disclosure.

For example, the present disclosure can assume a configuration for cloud computing in which one function is shared by a plurality of apparatuses through a network and processed in collaboration.

Further, the steps described hereinabove in connection with the flow charts can be executed by a single apparatus or can be executed by sharing by a plurality of apparatuses.

Furthermore, in a case where one step includes a plurality of processes, the plurality of processes included in the one step can be executed by a single apparatus and also can be executed by sharing by a plurality of apparatuses.

It is to be noted that the present disclosure can assume such a configuration as described below.

(1)

An image processing apparatus, including:

an image generation section configured to generate a texture image of a predetermined viewpoint using a texture image obtained by projecting, to a projection face perpendicular to a sight line direction heading from each of two viewpoints which are opposed to each other across the center of a polygon, toward a center of the polygon, a rear face of the polygon and a depth image corresponding to the texture image of each of the viewpoints.

(2)

The image processing apparatus according to (1), in which the image generation section generates a texture image of the predetermined viewpoint on a basis of viewpoint information indicative of positions of the two viewpoints.

(3)

The image processing apparatus according to (1) or (2), in which the polygon is generated using picked up images acquired by a plurality of imaging apparatuses which are disposed around an imaging object corresponding to the polygon and include at least part of the imaging object in an imaging range thereof, and depth images corresponding to the picked up images.

(4)

The image processing apparatus according to (3), in which the image generation section generates a texture image of the predetermined viewpoint using a texture image of an omnidirectional image generated using the picked up images acquired by the plurality of imaging apparatuses and a depth image of the omnidirectional image generated using the depth images corresponding to the picked up images acquired by the plurality of imaging apparatuses.

(5)

An image processing method executed by an image processing apparatus, including:

an image generation step of generating a texture image of a predetermined viewpoint using a texture image obtained by projecting, to a projection face perpendicular to a sight line direction heading from each of two viewpoints which are opposed to each other across a center of a polygon, toward the center of the polygon, a rear face of the polygon and a depth image corresponding to the texture image of each of the viewpoints.

(6)

An image processing apparatus, including:

an image generation section configured to generate a texture image by projecting, to a projection face perpendicular to a sight line direction heading from each of two viewpoints which are opposed to each other across a center of a polygon, toward the center of the polygon, a rear face of the polygon and generate a depth image corresponding to the texture image of each of the viewpoints.

(7)

The image processing apparatus according to (6), further including:

a viewpoint information generation section configured to generate viewpoint information indicative of positions of the two viewpoints.

(8)

The image processing apparatus according to (7), in which the viewpoint information generation section generates a plurality of pieces of the viewpoint information, and the image generation section generates, for each of the pieces of the viewpoint information generated by the viewpoint information generation section, texture images of the two viewpoints, sets the texture images of the two viewpoints corresponding to the piece of the viewpoint information in which the region of the rear face of the polygon projected when the texture images of the two viewpoints are generated from among the plurality of pieces of the viewpoint information as final texture images of the two viewpoints, and generates depth images individually corresponding to the final texture images of the two viewpoints.

(9)

The image processing apparatus according to (8), in which the two viewpoints are determined by successively rotating a straight line which interconnects predetermined two viewpoints and passes a center of the polygon, by a predetermined amount in at least one direction around the center of the polygon.

(10)

The image processing apparatus according to (8), in which the viewpoint information generation section outputs pieces of viewpoint information individually corresponding to the final texture images of the two viewpoints.

(11)

The image processing apparatus according to any of (6) to (10), further including:

a polygon generation section configured to generate the polygon using picked up images acquired by a plurality of imaging apparatuses which are disposed around an imaging object corresponding to the polygon and include at least part of the imaging object in an imaging range thereof, and depth images corresponding to the picked up images.

(12)

The image processing apparatus according to (11), further including:

an omnidirectional image generation section configured to generate a texture image of an omnidirectional image using the picked up images acquired by the plurality of image pickup apparatuses and generate a depth image of the omnidirectional image using depth images corresponding to the picked up images acquired by the plurality of imaging apparatuses.

(13)

An image processing method executed by an image processing apparatus, including:

an image generation step of generating a texture image by projecting, to a projection face perpendicular to a sight line direction heading from each of two viewpoints which are opposed to each other across a center of a polygon, toward the center of the polygon, a rear face of the polygon and generating a depth image corresponding to the texture image of each of the viewpoints.

REFERENCE SIGNS LIST 11-1 to 11-N imaging apparatus, 12 generation apparatus, 34 polygon generation section, 35 drawing section, 61 imaging object, 81 sphere, 200 display apparatus, 205 drawing section, 300 generation apparatus, 301 viewpoint controlling section, 302 drawing section, 341 straight line

The invention claimed is:

1. An image processing apparatus, comprising:
a central processing unit (CPU) configured to generate a first texture image of a specific viewpoint, based on each of a second texture image of a first viewpoint, a third texture image of a second viewpoint, a first depth image corresponding to the second texture image, and a second depth image corresponding to the third texture image, wherein
the second texture image is obtained based on projection of a first rear face of a polygon to a first projection face with respect to the first viewpoint,
the third texture image is obtained based on projection of a second rear face of the polygon to a second projection face with respect to the second viewpoint,
the first projection face is perpendicular to a first sight line direction,
the second projection face is perpendicular to a second sight line direction,
the first sight line direction is from the first viewpoint to a center of the polygon,
the second sight line direction is from the second viewpoint to the center of the polygon,
the first viewpoint and the second viewpoint are opposed to each other across the center of the polygon;
the second texture image corresponds to a first reconstructed portion of the polygon,
the third texture image corresponds to a second reconstructed portion of the polygon, and
each of the first reconstructed portion of the polygon and the second reconstructed portion of the polygon is greater than one-half of the polygon.

2. The image processing apparatus according to claim 1, wherein the CPU is further configured to generate a fourth texture image of the specific viewpoint based on viewpoint information indicative of positions of the first viewpoint and the second viewpoint.

3. The image processing apparatus according to claim 1, wherein
the polygon is generated based on picked up images and depth images corresponding to the picked up images,
the picked up images are acquired by a plurality of cameras which is around an imaging object,
the imaging object corresponds to the polygon, and
at least a part of the imaging object is in an imaging range of each of the plurality of cameras.

4. The image processing apparatus according to claim 3, wherein
the CPU is further configured to generate a fourth texture image of the specific viewpoint based on a fifth texture image of an omnidirectional image and a third depth image of the omnidirectional image,
the fifth texture image of the omnidirectional image is based on the picked up images, and
the third depth image of the omnidirectional image is based on the depth images corresponding to the picked up images.

5. An image processing method, comprising:
in an image processing apparatus:
generating a first texture image of a specific viewpoint, based on each of a second texture image of a first viewpoint, a third texture image of a second viewpoint, a first depth image corresponding to the second texture image, and a second depth image corresponding to the third texture image, wherein
the second texture image is obtained based on projection of a first rear face of a polygon to a first projection face with respect to the first viewpoint,
the third texture image is obtained based on projection of a second rear face of the polygon to a second projection face with respect to the second viewpoint,
the first projection face is perpendicular to a first sight line direction,
the second projection face is perpendicular to a second sight line direction,
the first sight line direction is from the first viewpoint to a center of the polygon,
the second sight line direction is from the second viewpoint to the center of the polygon,
the first viewpoint and the second viewpoint are opposed to each other across the center of the polygon,
the second texture image corresponds to a first reconstructed portion of the polygon,
the third texture image corresponds to a second reconstructed portion of the polygon, and each of the first reconstructed portion of the polygon and the second reconstructed portion of the polygon is greater than one-half of the polygon.

6. An image processing apparatus, comprising:
a central processing unit (CPU) configured to:
generate each of a first texture image of a first viewpoint and a second texture image of a second viewpoint, wherein
the generation of the first texture image is based on projection of a first rear face of a polygon to a first projection face with respect to the first viewpoint,
the generation of the second texture image is based on projection of a second rear face of the polygon to a second projection face with respect to the second viewpoint,
the first projection face is perpendicular to a first sight line direction,
the second projection face is perpendicular to a second sight line direction,
the first sight line direction is from the first viewpoint to a center of the polygon,
the second sight line direction is from the second viewpoint to the center of the polygon,
the first viewpoint and the second viewpoint are opposed to each other across the center of the polygon,
the first texture image corresponds to a first reconstructed portion of the polygon,
the second texture image corresponds to a second reconstructed portion of the polygon, and
each of the first reconstructed portion of the polygon and the second reconstructed portion of the polygon is greater than one-half of the polygon; and
generate a first depth image and a second depth image,
wherein the first depth image corresponds to the first texture image and the second depth image corresponds to the second texture image.

7. The image processing apparatus according to claim 6, wherein the CPU is further configured to generate viewpoint information indicative of positions of the first viewpoint and the second viewpoint.

8. The image processing apparatus according to claim 7, wherein the CPU is further configured to:
generate a plurality of pieces of the viewpoint information indicating a plurality of candidate pairs of positions of the first viewpoint and the second viewpoint;
generate, for each of the plurality of candidate pairs of positions of the first viewpoint and the second viewpoint, texture images of the first viewpoint and the second viewpoint;
set the texture images corresponding to a specific candidate pair of positions of the plurality of candidate pairs of positions of the first viewpoint and the second viewpoint, as final texture images of the first viewpoint and the second viewpoint,
wherein the set texture images, corresponding to the specific candidate pair of positions of the first viewpoint and the second viewpoint, has a largest region of a specific rear face of the polygon among the texture images corresponding to the plurality of candidate pairs of positions of the first viewpoint and the second viewpoint; and
generate depth images individually corresponding to the final texture images of the first viewpoint and the second viewpoint.

9. The image processing apparatus according to claim 8, wherein
the CPU is further configured to determine the plurality of candidate pairs of positions of the first viewpoint and the second viewpoint based on successive rotation of a straight line by a specific amount in at least one direction around the center of the polygon,
the straight line interconnects the first viewpoint and the second viewpoint, and
the straight line passes through the center of the polygon.

10. The image processing apparatus according to claim 8, wherein the CPU is further configured to output the plurality of pieces of the viewpoint information individually corresponding to the final texture images of the first viewpoint and the second viewpoint.

11. The image processing apparatus according to claim 6, wherein
the CPU is further configured to generate the polygon based on picked up images and depth images corresponding to the picked up images,
the picked up images are acquired by a plurality of cameras which is around an imaging object,
the imaging object corresponds to the polygon, and
at least a part of the imaging object is in an imaging range of each of the plurality of cameras.

12. The image processing apparatus according to claim 11, wherein the CPU is further configured to:
generate a third texture image of an omnidirectional image based on the picked up images; and
generate a third depth image of the omnidirectional image based on the depth images corresponding to the picked up images.

13. An image processing method, comprising:
in an image processing apparatus:
generating each of a first texture image of a first viewpoint and a second texture image of a second viewpoint, wherein
the generation of the first texture image is based on projection of by projecting a first rear face of a polygon to a first projection face with respect to the first viewpoint,
the generation of the second texture image is based on projection of a second rear face of the polygon to a second projection face with respect to the second viewpoint,
the first projection face is perpendicular to a first sight line direction,
the second projection face is perpendicular to a second sight line direction,
the first sight line direction is from the first viewpoint to a center of the polygon,
the second sight line direction is from the second viewpoint to the center of the polygon,
the first viewpoint and the second viewpoint are opposed to each other across the center of the polygon,
the first texture image corresponds to a first reconstructed portion of the polygon,
the second texture image corresponds to a second reconstructed portion of the polygon, and
each of the first reconstructed portion of the polygon and the second reconstructed portion of the polygon is greater than one-half of the polygon; and
generating a first depth image and a second depth image,
wherein the first depth image corresponds to the first texture image and the second depth image corresponds to the second texture image.

14. An image processing apparatus, comprising:
a central processing unit (CPU) configured to:
  generate each of a first texture image of a first viewpoint and a second texture image of a second viewpoint, wherein
    the generation of the first texture image is based on projection of a first rear face of a polygon to a first projection face with respect to the first viewpoint,
    the generation of the second texture image is based on projection of a second rear face of the polygon to a second projection face with respect to the second viewpoint,
    the first projection face is perpendicular to a first sight line direction,
    the second projection face is perpendicular to a second sight line direction,
    the first sight line direction is from the first viewpoint to a center of the polygon,
    the second sight line direction is from the second viewpoint to the center of the polygon, and
    the first viewpoint and the second viewpoint are opposed to each other across the center of the polygon;
  generate a first depth image and a second depth image, wherein the first depth image corresponds to the first texture image and the second depth image corresponds to the second texture image;
  determine a plurality of candidate pairs of positions of the first viewpoint and the second viewpoint based on successive rotation of a straight line by a specific amount in at least one direction around the center of the polygon, wherein
    the straight line interconnects the first viewpoint and the second viewpoint, and
    the straight line passes through the center of the polygon;
  generate a plurality of pieces of viewpoint information indicating the plurality of candidate pairs of positions of the first viewpoint and the second viewpoint;
  generate, for each of the plurality of candidate pairs of positions of the first viewpoint and the second viewpoint, texture images of the first viewpoint and the second viewpoint;
  set the texture images corresponding to a specific candidate pair of positions of the plurality of candidate pairs of positions of the first viewpoint and the second viewpoint, as final texture images of the first viewpoint and the second viewpoint,
    wherein the set texture images, corresponding to the specific candidate pair of positions of the first viewpoint and the second viewpoint, has a largest region of a specific rear face of the polygon among the texture images corresponding to the plurality of candidate pairs of positions of the first viewpoint and the second viewpoint; and
  generate depth images individually corresponding to the final texture images of the first viewpoint and the second viewpoint.

\* \* \* \* \*